United States Patent
Goswami et al.

(10) Patent No.: US 12,541,342 B1
(45) Date of Patent: Feb. 3, 2026

(54) PLATFORM FOR AUTOMATED INFRASTRUCTURE-AS-CODE GENERATION AND DEPLOYMENT USING MULTI-AGENT ARCHITECTURE

(71) Applicant: ExlService Holdings, Inc., New York, NY (US)

(72) Inventors: Anish Goswami, Pune (IN); Sarika Pal, Bangalore (IN); Vignesh Narayanaswamy, Chrompet (IN); Vinod Morya, Pilibhit (IN); Kommoju Satya Venkata Naresh Kumar, Anakapalli (IN); Kovida Samir Kshatri, Pitam Pura (IN); Nagubadi Trinadh, Miyapur (IN); Rahul Bishwas, Karnal (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/354,378

(22) Filed: Oct. 9, 2025

(51) Int. Cl.
  *G06F 8/30* (2018.01)

(52) U.S. Cl.
  CPC ..................... *G06F 8/30* (2013.01)

(58) Field of Classification Search
  USPC ................................ 717/106–109
  See application file for complete search history.

(56) References Cited

U.S. PATENT DOCUMENTS

| | | | | |
|---|---|---|---|---|
| 12,355,626 B1* | 7/2025 | Varakantam | ........... | H04L 67/535 |
| 12,423,452 B1* | 9/2025 | Singh | ................... | G06N 3/0475 |
| 2022/0229637 A1* | 7/2022 | Benassi | ................... | G06F 8/427 |
| 2023/0075183 A1* | 3/2023 | Copty | ......................... | G06F 8/51 |
| 2023/0153076 A1* | 5/2023 | Benassi | ................... | G06F 8/316 |
| | | | | 717/106 |
| 2023/0259390 A1* | 8/2023 | Howley | ..................... | G06F 8/63 |
| | | | | 718/102 |
| 2024/0037227 A1* | 2/2024 | Deutscher | ............. | G06F 21/554 |
| 2024/0329983 A1* | 10/2024 | Bregman | .................. | G06F 8/77 |
| 2025/0028514 A1* | 1/2025 | Awan | ......................... | G06F 8/61 |
| 2025/0117263 A1* | 4/2025 | McDiarmid | ........... | G06F 9/5072 |
| 2025/0123810 A1* | 4/2025 | Havewala | ................. | G06F 8/30 |
| 2025/0190193 A1* | 6/2025 | Ito | .............................. | G06F 8/35 |
| 2025/0321719 A1* | 10/2025 | Hoban | ....................... | G06F 8/34 |
| 2025/0321746 A1* | 10/2025 | Hoban | .................. | G06F 9/4401 |

* cited by examiner

Primary Examiner — Qing Chen
(74) Attorney, Agent, or Firm — Perkins Coie LLP

(57) ABSTRACT

Systems and methods are disclosed for automated generation, validation, and deployment of infrastructure-as-code (IaC) using a multi-agentic artificial intelligence/machine learning (AI/ML) architecture. An extraction agent parses multimodal artifacts (e.g., diagrams and/or configuration data) to derive or generate infrastructure set-up parameters. A coding agent generates IaC units based on the extracted parameters. A validation agent determines the syntactic and semantic compliance of the generated IaC, classifying the IaC as executable, non-executable, or identifying corrective actions. A deployment agent transmits executable IaC to target computing environments and manages automated provisioning of the IaC in the target environments. In cases of validation failure, error indicators are provided to a user (e.g., via an agentic chat bot) for clarification or correction, enabling iterative refinement.

17 Claims, 7 Drawing Sheets

PLATFORM FOR AUTOMATED INFRASTRUCTURE-AS-CODE GENERATION AND DEPLOYMENT USING MULTI-AGENT ARCHITECTURE

TECHNICAL FIELD

The present disclosure generally relates to computer-implemented systems for provisioning and managing computing infrastructure resources in cloud environments. More specifically, aspects of the present disclosure relate to infrastructure-as-code workflows and methods for describing, validating, and deploying infrastructure resources across distributed computing systems via multiple agents in an agentic architecture.

BACKGROUND

Enterprises increasingly leverage cloud computing environments to provision, manage, and operate scalable infrastructure resources. To address the challenges associated with configuring and maintaining such environments, infrastructure-as-code (IaC) tools have become widely adopted. IaC is a method of managing and provisioning IT infrastructure using code instead of manual processes. This approach allows teams to automate the setup and management of their infrastructure, making it more efficient and consistent. IaC is particularly useful in the DevOps environment, where teams are constantly updating and deploying software. IaC enables users to define and manage cloud infrastructure resources (e.g., networks, computing resources, storage, databases, and security policies) using human-readable configuration files written in programming languages or templates specific to various cloud service providers. Conventional IaC workflows require users (e.g., cloud administrators) to manually author, edit, and maintain IaC scripts to describe a specific infrastructure in accordance with a user's design. The manual process requires proficiency with the syntactic and semantic rules of particular IaC formats and the underlying application programming interfaces (APIs) of multiple cloud vendors. As a result, manual IaC authoring can be slow, error-prone, and susceptible to misconfigurations that can introduce operational risks or security vulnerabilities.

The validation and testing of IaC scripts can also present significant challenges. Conventional approaches depend on separate tools and/or manual review to check IaC units for syntactic correctness, standards compliance, and/or cloud provider best practices, leading to fragmented validation workflows and increased risk of deployment failures. When issues or errors are identified, corrective editing generally involves additional manual steps, which lengthens deployment cycles and introduces further opportunity for error. Furthermore, collaboration among development, operations, and security teams can be hampered by a lack of standardization and reusable code components in many conventional practices. This fragmentation can make it difficult to maintain consistent and compliant infrastructure definitions across different projects or environments. Rapid evolution in cloud provider APIs and recommended practices adds further complexity, creating ongoing challenges for organizations attempting to maintain up-to-date IaC configurations.

BRIEF DESCRIPTION OF THE DRAWINGS

Detailed descriptions of implementations of the present invention will be described and explained through the use of the accompanying drawings.

Figure 1:
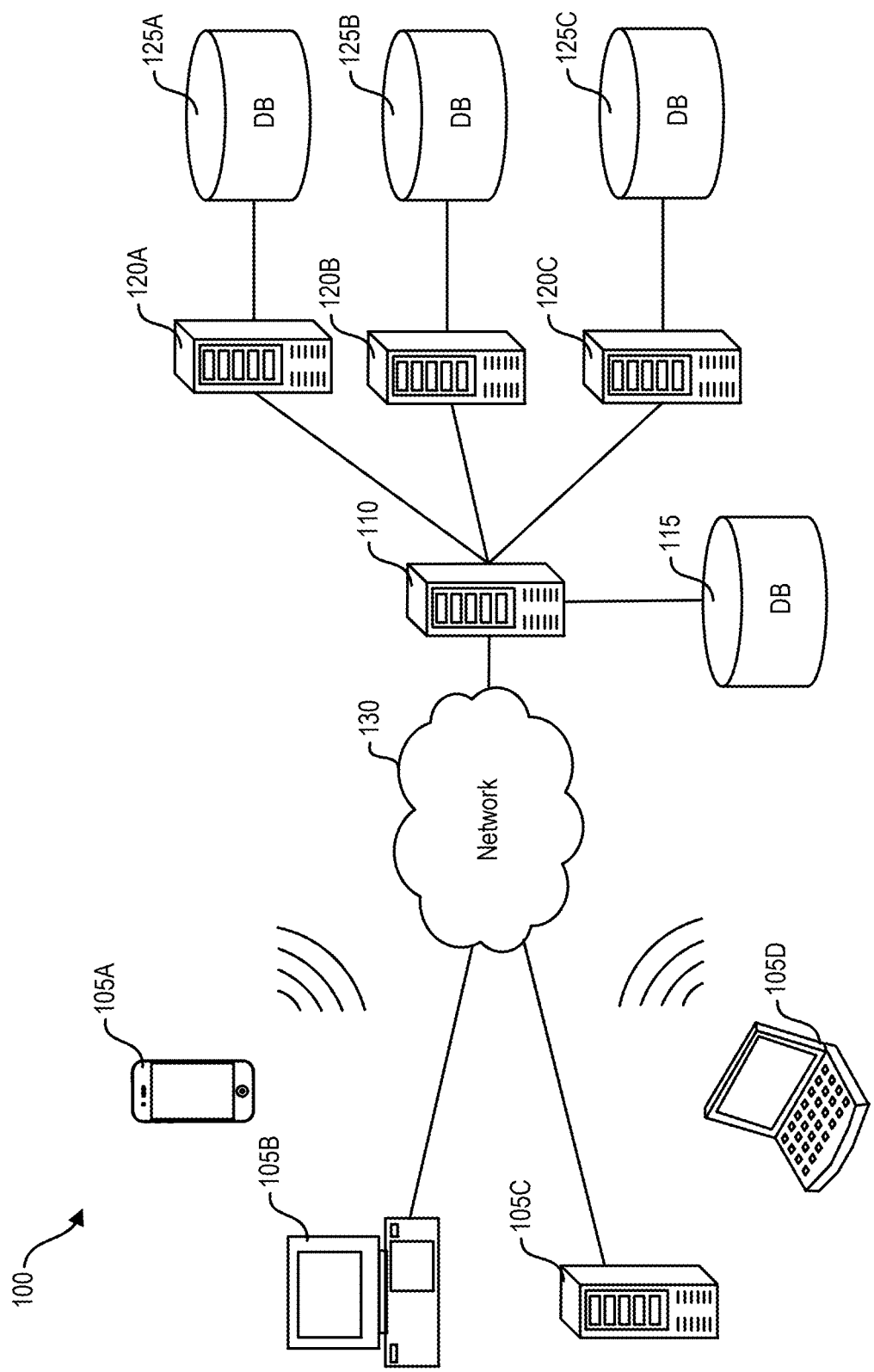
FIG. 1 is a system diagram illustrating an example of a computing environment in which the disclosed system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Modern organizations rely on cloud infrastructure to support organizational operations. However, they face challenges in efficiently and accurately provisioning and managing distributed computing resources. Teams (e.g., engineers, architects, and administrators) within organizations work in coordination to manually translate high-level infrastructure requirements into complex, executable IaC scripts.

An example IaC script can include complex dependencies, such as virtual machine configurations, network settings, security policies, and storage allocations. Manually translating high-level infrastructure requirements into executable scripts can be error-prone and tedious. For example, a virtual machine configuration process can entail specifying an operating system image with a specific number of CPU cores, a specific amount of random-access memory, and a specific disk size. Ensuring that the manually-specified image is compatible with the specified compute profile and storage requirements can be a complex dependency to track. As another example, specifying network settings can include defining a firewall rule that allows inbound traffic on a specific port. Manually keeping track of which ports are open, to which IP addresses, and for which services can lead to inconsistencies and security vulnerabilities. As another example, security policies can specify authentication and authorization rules for accessing specific resources. Manually applying these policies across multiple virtual machine instances, environments, and resources can be a daunting task, prone to human error. As another example, storage allocation can entail specifying a persistent disk with a certain size and performance tier. Manually ensuring that the storage volume is properly attached to the correct virtual machine instance, with appropriate permissions and access controls, can be a complex dependency to manage.

This manual and error-prone process can lead to configuration inconsistencies, deployment delays, and scalability challenges. The inventors have recognized the need to provide network architects with a practical, end-to-end solution that enables users to move from computing system/environment designs, such as architecture diagrams and/or project requirements (natural-language, alphanumeric, tabular, multimodal), to infrastructure.

The systems and methods described herein address the above-described technical challenges by disclosing an agentic architecture that intelligently performs the generation, validation, and deployment of IaC across cloud service providers. The disclosed system can analyze user-provided artifacts to generate infrastructure code, detect configuration errors in real-time and self-correct the errors, and scale resources adaptively using predictive analytics.

In some implementations, the agentic architecture described herein can incorporate the Model Context Protocol (MCP), an open standard designed to enable standardized and secure interactions between AI/ML agents and external cloud infrastructure resources. MCP can facilitate real-time context sharing for IaC generation and deployment across multi-cloud environments. By providing a standardized framework for dynamic interaction with APIs, databases, and other external systems, MCP can enable discovery, codification, and management of infrastructure components, reduce latency in iterative refinement cycles, and enhance compliance with IaC best practices.

In some implementations, a variant of the disclosed system enables users to provide high-level artifacts (e.g., architectural diagrams, configuration data, requirements documents) through a user interface from a computing device (e.g., mobile phone, laptop, desktop). The system spins up a network of specialized agents, each configured to perform operations in the automated IaC workflow, to transform user input into executable code. In an example use case, when a user initiates an infrastructure provisioning workflow, an extraction agent receives the provided artifacts and applies a machine learning model to parse diagrams and metadata. The extraction agent identifies infrastructure entities, attributes, and relationships, and derives or generates a structured set of parameters that define the intended cloud resources. For example, the extraction agent can parse the metadata associated with artifact components to identify a requirement for a virtual machine with a high-performance compute profile and a Linux-based operating system image, and generate parameters specifying 4 CPU cores, 16 GB RAM, and a specific disk size.

To continue the example, a coding agent can use the generated parameters to generate an initial IaC script and implement processing logic to ensure that the code reflects the user's intent, organizational policies, and current best practices. For example, where organizational policies specify a particular ingress point for Internet traffic, the coding agent can generate a script that creates a virtual machine instance with the specified compute profile and operating system image and configure the network settings to allow incoming traffic on TCP port 80.

In some implementations, the disclosed agents can apply retrieval-augmented generation (RAG) techniques to conform the generated IaC units to rule sets codified in ontologies, operational requirements, and/or system design requirements. This approach enables automatic detection and/or targeted recommendation generation for infrastructure resource requirements and operational constraints during the code generation process. By leveraging AI- and ML-driven inference techniques, the agents can extract or infer configuration details—such as virtual machine sizing, storage quotas, network bandwidth, and the like—directly from user goals, which can be expressed in natural-language form and/or high-level design artifacts, by detecting, analyzing and/or generating metadata associated with artifact components, such as nodes and connectors. For example, the agents can infer the need for a 500 GB high-performance storage volume attached to a database server instance, based on the user's natural-language description of the workload requirements. This automated process ensures that generated IaC implements the user's explicit instructions and generates resource descriptions and settings (parameters) that are aligned with performance, scalability, and compliance objectives.

In some implementations, a validation agent automatically analyzes (e.g., via dynamic and/or static analysis) the generated IaC, checking for syntactic correctness and compliance with configuration standards.

In some implementations, in response to a determination that the generated IaC is executable, a deployment agent transmits the code to multiple cloud service computing systems to enable automated provisioning of the specified infrastructure. Conversely, when the validation agent identifies errors or omissions in the generated IaC units, the system generates detailed error indicators and transmits the error indicators to the user's computing device. For example, the validation agent can detect that the generated IaC script is missing a particular security group configuration and generate an error indicator highlighting the omission.

In some implementations, the disclosed system enables users to review the generated indicators via the user interface of the computing device and provides targeted feedback such as clarifying requirements, supplying missing parameter values, selecting resource types, or approving system-proposed modifications. For example, the user can provide feedback specifying the security group configuration, which can allow the coding agent to update the IaC script accordingly. The extraction agent collects the user feedback and transmits the user feedback, along with the non-executable IaC and error indicators, to the coding agent. The coding agent updates the IaC in response to the feedback, and the agents iteratively repeat the validation and update process until the validation agent classifies the IaC as executable. A deployment agent then transmits the validated IaC to target computing systems.

As used herein, the term "agent" refers to a software, hardware, or firmware-based entity, module, or process configured to autonomously or semi-autonomously make decisions and perform actions within the code generation platform. Agents can interpret inputs (e.g., user requests, data artifacts), execute operations (e.g., data extraction, validation, transformation), coordinate with other computing agents or modules, and initiate changes in system state. Agents can be implemented as executable instructions on one or more processors, can invoke one or more artificial intelligence or machine learning models, and are not limited to any specific implementation, architecture, or decision-making algorithm. An example agent can include or have provided thereto a set of compute resources to carry out agentic operations. The compute resources can include processor(s), memory units, and/or network interfaces.

As used herein, the term "metadata" refers to data that provides context, description, or additional information about other data or entities, such as infrastructure resources, diagrams, or design artifacts. Metadata can include attributes, properties, or characteristics of the entities, such as instance types, operating systems, CPU and memory requirements, storage requirements, network configurations, security settings, and other relevant details. Metadata can be derived from diagram objects through various techniques, including computer vision algorithms that analyze visual elements, image processing techniques that identify specific features, optical character recognition (OCR) that extracts text, and diagram parsing algorithms that analyze structure and content. Machine learning models can also be trained on a dataset of diagrams and corresponding metadata to learn patterns and relationships. These techniques can be used individually or in combination to extract metadata, such as resource types, properties, relationships, and configuration settings, from diagrams.

Metadata associated with input artifacts, such as diagram entities, can provide context for infrastructure provisioning. For servers, metadata can include instance type, such as web server or database server, operating system, CPU and memory requirements, storage requirements including disk size and storage class, network configuration including IP address and subnet, security groups and access controls, and monitoring and logging settings. For connectors, metadata can include connection type, such as HTTP or SSH, source and destination entities, port numbers and protocols, authentication and authorization settings, and encryption settings. For databases, metadata can include database type, database engine, storage requirements, instance type, authentication and authorization settings, and backup and recovery settings. For networks, metadata can include network type, subnet configuration, gateway configuration, firewall rules and access controls, and quality of service settings. For storage, metadata can include storage type, storage class, disk size and performance requirements, access controls and security settings, and backup and recovery settings.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which a code generation platform (e.g., code generation platform 208 described in relation to FIG. 2) operates in some implementations of the present technology. As used herein, the terms "platform," "system," and like terms are used interchangeably.

In some implementations, environment 100 includes one or more client computing devices 105 (e.g., client computing devices 105A-D). Client computing devices 105 operate in a networked environment using logical connections through network 130 to one or more remote computers, such as a server computing device. In some implementations, a particular client computing device can include, but not be limited to, a mobile phone or tablet (e.g., client computing device 105A), a desktop (e.g., client computing device 105B), a laptop (e.g., client computing device 105D), smart glasses, etc. Furthermore, the client computing devices 105 can include one or more built-in or externally coupled accessories including, but not limited to, a visual aid device such as a camera, an audio aid, a microphone, or a keyboard.

In some implementations, server 110 is an edge server that receives client requests and coordinates fulfillment of those requests through other servers, such as servers 120A-C. In some implementations, server 110 and server 120 comprise computing systems. Though each server (e.g., server 110 and server 120) is displayed logically as a single server, server computing devices can each be a distributed computing environment encompassing multiple computing devices located at the same or at geographically disparate physical locations. In some implementations, each server 120 corresponds to a group of servers.

Client computing devices 105 and server 110 and server 120 can each act as a server or client to other server or client devices. In some implementations, servers (e.g., server 110 or server 120A-C) connect to a corresponding database (e.g., server 115 or server 125A-C). As discussed above, each server 120 can correspond to a group of servers, and each of these servers can share a database or can have its own database. Database 115 and database 125 warehouse (e.g., store) information such as inputs, libraries, configuration data, agent ouputs, extracted data, and so forth. Though database 115 and database 125 are displayed logically as single units, database 115 and database 125 can each be a distributed computing environment encompassing multiple computing devices, can be located within their corresponding server, or can be located at the same or at geographically disparate physical locations.

Network 130 can be a local area network (LAN) or a wide area network (WAN), but can also be other wired or wireless networks. In some implementations, network 130 is the Internet or some other public or private network. Client computing devices 105 are connected to network 130 through a network interface, such as by wired or wireless communication. While the connections between server 110 and server(s) 120 (e.g., server 120A, server 120B, and/or server 120C) are shown as separate connections, these connections can be any kind of local, wide area, wired, or wireless network, including network 130 or a separate public or private network. In some implementations, network 130 can include, by way of example but not limitation, at least a portion of one or more networks having one or more nodes that transmit, receive, forward, generate, buffer, store, route, switch, or process one or more messages, packets, signals, waves, voltage or current levels, or some combination thereof.

Example Code Generation Platform

Figure 2:
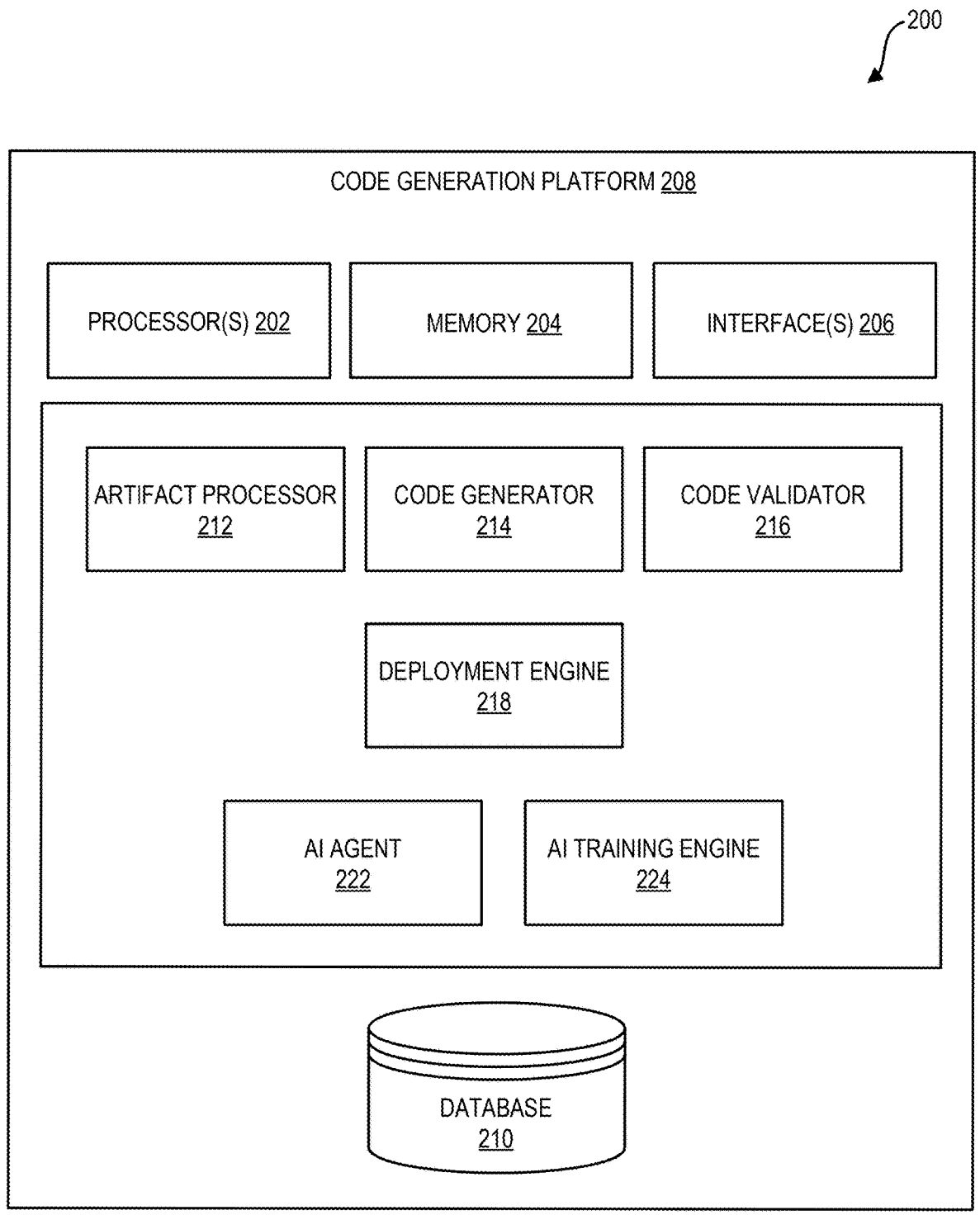
FIG. 2 illustrates an example of the architecture and use cases for a code generation platform, in accordance with some arrangements.

FIG. 2 illustrates an example architecture 200 of a code generation platform 208, in accordance with some arrangements of the present disclosure. Code generation platform 208 can automatically generate IaC executables using artifacts (e.g., data, diagrams, or metadata) processed by one or more specialized modules (e.g., artifact processor 212, code generator 214, code validator 216, and deployment engine 218). The artifacts or identifying information therefore can be provided by a user. Code generation platform 208 can coordinate with the one or more specialized modules to process (e.g., manage, assign, access, ingest, parse, generate, validate, revise, and/or deploy) the user-provided artifacts into code for cloud infrastructure. For example, code generation platform 208 can coordinate the sequence of the one or more specialized modules by using rule-based logic to trigger operations in the workflow (e.g., via an agentic architecture with specialized artificial intelligence agents). Furthermore, code generation platform 208 can enhance coordination of the specialized modules through application of machine learning models and reinforcement learning algorithms, which automate decision-making by selecting among alternative execution paths, adjust processing steps based on observed system performance, and adapt the execution order in response to feedback and operational outcomes.

According to various implementations, the specialized modules can be or include hardware, middleware, software, executables, agents (e.g., specialized entities in an agentic architecture), and so forth. Code generation platform 208 can include or access (e.g., at an external system, at a cloud-based system) one or more processors 202, one or more memory units 204, and one or more interfaces 206. The processors 202 can be configured to execute special-purpose computer-executable instructions stored in the memory units 204. The computer-executable instructions can invoke various other specialized hardware elements of the code generation platform 208, such as graphics processing units (GPUs) for machine learning computations, tensor processing units (TPUs) for tensor operations, digital signal processors (DSPs) for signal processing, and field-programmable gate arrays (FPGAs) for accelerating specific tasks.

Artifact processor 212 can receive user-provided artifacts (e.g., code generation platform 208 transmits data provided by user via a user device), including visual diagrams (e.g., network topologies, architecture blueprints) and configuration instructions. Artifact processor 212 can use computer vision algorithms to identify and classify node types, connections, and relationships, utilizing, for example, convolutional neural networks for shape and label recognition from the user-provided artifacts. In some implementations, artifact processor 212 uses OCR and feature extraction algorithms to convert visual elements into machine-interpretable metadata. In parallel, artifact processor 212 can use natural language processing (NLP) models to parse textual directives and extract requirements, preferences, or policy constraints. In some implementations, artifact processor 212 can associate extracted entities and attributes to infrastructure parameters using domain ontologies and knowledge graphs, quantifying specifications from users into the parameters. For example, artifact processor 212 can map user requirements to provider-specific resource parameters, such as mapping high transaction volumes to a solid-state drive (SSD) with a capacity of greater than 500 GB and a high number of input/output operations per second (IOPS). Artifact processor 212 can convert the user requirements extracted from the artifacts into explicit cloud-provider-compliant configurations (e.g., AWS, Azure). For example, artifact processor 212 can normalize and vectorize the user-input data, compiling feature vectors (e.g., resource type, service level, historical results, policies, risk) as multidimensional tensors, which can support subsequent code generation and strategy selection (e.g., AWS gp3, Azure Premium SSD).

Code generator 214 can receive normalized feature vectors (e.g., to provide informed decision making for generating code) and configuration parameters produced by artifact processor 212. Code generator 214 can use AI/ML-driven language models and rule-based algorithms to convert these parameters into IaC scripts that comply with provider-specific syntax requirements (e.g., AWS CloudFormation, Azure Resource Manager). For example, code generator 214 can create block templates with variable declarations and resource definitions aligned with the identified cloud provider. Code generator 214 can reference mapped ontologies and user policies in assembling code templates to ensure alignment with configuration preferences and security and/or compliance standards. After generating the initial code, code generator 214 can apply naming conventions, modularize files, and format outputs for readability and organizational consistency. In some implementations, code generator 214 can support iterative improvement of generated IaC in response to notifications regarding updates (e.g., new data or requirements provided by user) or errors from code validator 216. Code generator can update code artifacts to refine resource allocation or parameter settings. For example, if prior deployments indicate a need for increased storage performance, code generator 214 can adjust SSD configurations and regenerate relevant code sections.

Code validator 216 can receive generated IaC from code generator 214 and verify correctness, compliance, and operational readiness. Code validator 216 can use static analysis engines, schema validation algorithms, and NLP models to examine the code structure, variable assignments, resource definitions, and parameter values. For example, code validator 216 can compare block templates and resource fields against official cloud provider schemas (e.g., AWS CloudFormation, Azure Resource Manager) to confirm expected syntax and required property values. Code validator 216 can further enforce organizational and regulatory policies by validating naming conventions, tags, network settings, and resource allocation thresholds. For example, code validator 216 can inspect a virtual machine resource definition for completeness of security group references or check that all storage resources meet minimum encryption requirements.

In some implementations, when code validator 216 detects errors, omissions, or non-compliant configurations (e.g., missing environment tags, invalid subnet ID, or insufficient IOPS settings), code validator 216 can generate error messages pinpointing the affected code blocks and provide remediation suggestions. Code validator 216 can also classify validation results by type (e.g., executable, non-executable, policy violation) and transmit feedback to code generator 214 for iterative code refinement. For example, if a resource definition lacks a policy tag, code validator 216 can issue a correction recommendation for inclusion in the subsequent code generation cycle to support continuous improvement of IaC scripts. Code validator 216 can utilize AI/ML models that reference historical validation data and provider documentation to enhance detection of edge cases and emerging best practices. In some implementations, code validator 216 can use RAG algorithms to cross-reference code patterns with dynamically updated corpora to ensure ongoing compliance and readiness for deployment.

Deployment engine 218 can receive validated IaC from code validator 216 and initiate automated deployment to designated computing systems such as public cloud environments (e.g., AWS, Azure, Google Cloud Platform). Deployment engine 218 can prepare the validated IaC for execution by formatting, packaging (e.g., containerizing), and resolving environmental variables or dependencies required by the designated computing system. Deployment engine 218 can interface with provider-specific orchestration APIs to provision infrastructure components, monitor deployment status, and capture execution logs in real-time or near-real time. For example, deployment engine 218 can submit CloudFormation templates to AWS or ARM templates to Azure, inspect return codes, and parse error or success messages.

In some implementations, deployment engine 218 can implement automated rollback mechanisms in response to provisioning errors (e.g., resource limit violations, permission denials), restoring prior states when needed. For example, deployment engine 218 can record each deployment transaction with outcome signals (e.g., success or error type) transmitted as feedback to code validator 216 and stored in database 210 for further learning and improvement for every specialized module including AI agent 222 and AI training engine 224. Furthermore, deployment engine 218 can provide confirmation or remediation prompts to users and integrate with monitoring tools to track post-deployment performance and compliance.

AI agent 222 can manage agentic operations for the code generation platform 208 by interpreting user instructions, coordinating inter-module workflows, and handling requests throughout the lifecycle of cloud infrastructure provisioning. AI agent 222 can use NLP models to parse chat-based or API-delivered commands (e.g., "build," "modify," "deploy") to discern user intent and extract actionable parameters from mixed-format input. Upon parsing the user instructions, AI agent 222 can formalize extracted requests into structured tasks and direct the structured tasks to appropriate downstream modules such as artifact processor 212 for analysis or deployment engine 218 for provisioning. AI agent 222 can track operation status, manage data, and task handovers between the agents, resolve errors that can occur as data and tasks move between agents, and store contextual workflow metadata in database 210. For example, when multiple agents are needed (e.g., separate agents for validation and deployment steps), AI agent 222 can coordinate task parallelization and workflow progression. Furthermore, AI agent 222 can provide recommendations for best-practice solutions to fix generated IaC by referencing compliance databases and historical performance metrics. AI agent 222 can communicate corrective steps or advisory messages to users in response to detected issues or policy violations and adapt its routing logic (e.g., AI agent 222 determines and executes the transfer of tasks, messages, code artifacts, validation results, and commands between modules) via reinforcement learning feeds.

AI training engine 224 can continuously refine and retrain AI/ML models used by code generation platform 208, including models supporting artifact processor 212, code generator 214, code validator 216, deployment engine 218, and AI agent 222. AI training engine 224 can ingest operational feedback (e.g., in real-time or near real-time), such as user approvals, user disapprovals, code deployment success rates, error signals, and compliance violations to systematically enhance model accuracy and adaptability. AI training engine 224 can apply supervised, unsupervised, and reinforcement learning methodologies depending on available data and task requirements. For example, AI training engine 224 can use historical deployment data to retrain resource recommendation models, or process error types stemming from deployment engine 218 to improve validation algorithms or protocols. Furthermore, AI training engine 224 can source updated provider documentation and policy changes, integrating relevant rules into all AI/ML models used by code generation platform 208. Training cycles and validation results can be stored in database 210, creating a feedback loop that enables continuous state-of-the-art model performance and system compliance.

Use Cases for the Code Generation Platform

The foregoing description provides a general overview of code generation platform 208 and its constituent modules. The following sections set forth a more detailed discussion of the specific modules of code generation platform 208, including artifact processor 212, code generator 214, code validator 216, deployment engine 218, AI agent 222, and AI training engine 224. In particular, each module is described in terms sufficient for one of skill in the art to implement the module, including internal operation of the module, techniques, and algorithms each module can employ to process received input, and the manner in which each module outputs can be integrated into the platform architecture. The following sections further explain and provide various implementations for how the specialized modules can operate within code generation platform 208.

In some use cases, code generation platform 208 can use decision criterion tensors to perform reinforcement learning operations for generating and evolving channel optimization maps. As used herein, the term "tensor" refers to an N-dimensional array of numerical values, representing complex relationships between different variables or dimensions. A tensor can take various forms, including a scalar (e.g., a single number, or 0-dimensional tensor), a vector (e.g., a list of numbers, or 1-dimensional tensor), a matrix (e.g., a table of numbers, or 2-dimensional tensor), or a multi-dimensional array of numbers with three or more dimensions.

In some use cases enabled by code generation platform 208, tensors can enable generating and manipulating complex data structures and can be used to perform dynamic code generation optimization and to generate an executable IaC based on artifacts input by the user such as at least one diagram (e.g., cloud architecture diagram drawn or designed) or other data relevant to infrastructure components (e.g., user input history, user instructions, risk scores, policy information, public records, and the like). For example, a particular N-dimensional tensor can include N dimensions (e.g., risk classifications, behavior classifications, or other variables). Sets of points on the N dimensions can correspond to code generation strategies S. Code generation strategies S can include various parameters generated by the neural networks of the code generation platform 208, such as entity types, attributes, relationships that correspond to infrastructure components for generating IaC, and so forth.

In some use cases, code generation platform 208 can manage the multiple specialized module operations, using reinforcement learning algorithms to train an infrastructure that can enable the code generation platform 208 to automatically convert artifacts into optimized IaC from code generation to deployment to target computing system(s) and decision criterion tensors. By analyzing artifacts input by a user, code generation platform 208 can automatically generate executable IaC, using the insights gained from the tensor-based analysis and reinforcement learning. Furthermore, when the IaC generated by the code generation platform 208 is non-executable, the code generation platform 208 can use the insights gained from the tensor-based analysis and reinforcement learning to dynamically modify the generated non-executable IaC until the IaC is executable. Code generation platform 208 can implement and manage the specialized module operations by deploying autonomous or semi-autonomous agents via the communication channels, implementing guardrails for agent operations, and orchestrating agent handover operations.

In some use cases, the code generation platform 208 can vectorize the generated metadata and/or parameters and generate feature vectors, which can include embeddings that represent the vectorized values. The feature vectors can include resource type indicators, required service levels, historical deployment outcomes, user policy preferences, and risk metrics. In an example, feature vectors can be combined to form N-dimensional tensors, with each dimension corresponding to a distinct decision criterion. For example, a feature vector for a database server instance might include embeddings for resource type (e.g., database server), required service level (e.g., high availability), historical deployment outcomes (e.g., successful deployments in similar environments), user policy preferences (e.g., preference for AWS over Azure), and risk metrics (e.g., security risk assessment). These feature vectors can be used as input to machine learning models that predict optimal infrastructure configurations, identify potential deployment issues, or recommend resource allocations.

In some use cases, the artifact processor 212 and code generator 214 can access and analyze the tensor using operations such as normalization, slicing, or multidimensional aggregation, alongside a reinforcement learning module. During code generation, code generator 214 can evaluate potential resource configurations by projecting the resource configurations onto the tensor space (e.g., N-dimensional environment defined by the decision criterion tensor) to score each candidate solution according to the N-dimensional criteria. When the generated IaC is not executable, code generation platform 208 can apply tensor-based analysis to identify which dimensions (e.g., misaligned user policies, inadequate resources, or unmet risk conditions) have most influenced the IaC to not be executable. The feedback derived from the tensor-based analysis can include identification of specific parameter dimensions responsible for non-executable IaC that can guide code generation platform 208 to automate iterative adjustment and re-generation of the IaC until the IaC is executable.

In some use cases, code generation platform 208 can configure artifact processor 212 to parse user-provided artifacts (e.g., cloud infrastructure diagram and related configuration instructions) to generate feature vectors based on the extracted or generated metadata (e.g., sets of extracted parameters derived from user-provided artifacts or instructions). For example, the code generation platform 208 can apply a computer vision model to identify and classify specific elements in an infrastructure diagram. The determined elements (e.g., server, network, and so forth) can be used to generate a first set of metadata (e.g., instance type, network name, database name, connection type).

In some use cases, code generation platform 208 can also supplement the elements with a second set of metadata, which can be generated based on natural-language input received from the user. In an example, code generation platform 208 can apply an NLP model to parse user's directions, "Our database should support high-transaction volumes and fast query performance, with storage that can handle large amounts of data and provide low-latency access." Code generation platform 208 can identify key phrases, such as "high-transaction volumes," "fast query performance," "large amounts of data," and "low-latency access." Then, code generation platform 208 can access and apply a domain-specific ontology to map these terms to relevant infrastructure parameters. For example, "high-transaction volumes" may be mapped to a parameter for a particular IOPS (input/output operations per second) storage, while "fast query performance" may be mapped to a parameter for high CPU and memory allocation.

The ontology can provide numerical threshold indicators in the form of reference tables, lists, knowledge graphs, and so forth. To continue the example, the code generation platform 208 can also include a knowledge graph, which represents the relationships between infrastructure components, services, and performance metrics. Code generation platform 208 can query the knowledge graph to generate parameters for the optimal infrastructure configuration that meets the user's requirements. For example, based on this query, code generation platform 208 infers the need for a 500 GB high-performance storage volume, such as a solid-state drive (SSD), attached to a database server instance with a high-performance compute profile, such as a instance type with at least a predetermined number of CPU cores and at least a predetermined amount of memory. Artifact processor 212 of the code generation platform 208 can include a parameter translator that maps the generated infrastructure requirements to specific parameters for a particular computing system or target cloud provider, such as AWS or Azure. For example, the platform may map the requirement for a 500 GB high-performance storage volume to an AWS gp3 volume with 500 GB of storage and 3000 IOPS, or an Azure Premium SSD disk with 500 GB of storage and P30 performance tier.

In some use cases, code generation platform 208 can use reinforcement learning to collect features and implement code generation strategies to improve the generation of executable IaC. Code generation platform 208 can implement reinforcement by employing one or more machine learning models, artificial intelligence systems, or automated decision algorithms (referred to as AI/ML models), including but not limited to neural networks, reinforcement learning agents, decision trees, support vector machines, Bayesian inference engines, ensemble learning approaches, or combinations thereof. Through trial and error, the AI/ML models can learn to optimize the code generation strategies by receiving feedback in the form of instructions or updates to the user input (e.g., adding an updated diagram) and rewards or penalties based on user interactions. For example, if a user approves the generated IaC after the code validator 216 has classified the IaC as executable, the AI/ML models can receive a reward signal, indicating that the generated IaC classified by the code validator 216 as executable was effective. Conversely, if a user does not approve of the generated IaC, the AI/ML modules can receive a penalty signal, prompting the code generation platform 208 to adjust the strategy S, recommend a modification to the generated code, suggest at least one error indicator, request more data from the user, and so forth. In some implementations, the code generation platform 208 can provide the user with feedback to help the user identify and understand the error or errors causing the non-executable IaC.

By continuously updating the code generation strategies based on user feedback, the AI/ML models can refine their decision-making processes and improve the effectiveness of the code generation platform 208. An effective code generation platform 208 can reduce the time and expertise required to translate computer system(s) infrastructure design into deployable IaC. For example, users can upload cloud architecture diagrams (e.g., drawn or designed), and the code generation platform 208 can intelligently extract relevant infrastructure components (e.g., virtual machines, networks, databases) using language models. Code generation platform 208 can translate the extracted components from the artifacts input by the user into structured, production-ready code tailored for computer system(s). The multiple modules in code generation platform 208, such as artifact processor 212, code generator 214, code validator 216, and deployment engine 218, can understand user instructions and perform targeted changes to the code accordingly. Code generation platform 208 can include an AI-assisted chat interface structured to accept and process instructions (e.g., from user or AI agent) for iteratively refining the generated code. Code validator 216 can validate all modifications for syntax and structural correctness before deployment. Once validated, the deployment engine 218 can deploy the validated executable code directly to the computer system(s) (e.g., cloud providers referenced in the original architecture such as Azure, Amazon Web Services (AWS), or Google Cloud Platform (GCP)), enabling a seamless transition from design to infrastructure provisioning.

In some use cases, artifact processor 212 can implement a learning module (e.g., a neural network, decision tree, or random forest algorithm) trained on a corpus of historical IaC deployments. Artifact processor 212 can annotate the historical IaC deployments with metadata indicating deployment outcomes (e.g., successful completion, resource utilization metrics, compliance status, remediation actions). The artifact processor 212, when executing, can receive annotated infrastructure diagrams and configuration files from a user interface, and extract entity types, relationships, and parameter sets from those input files.

During execution, the extracted parameters are encoded as feature vectors, with each feature representing a decision criterion (e.g., required resource types, service level requirements, user policy preferences, and observed risk factors). The feature vectors are compiled into an N-dimensional tensor space representing the operational environment. For example, code generator 214 can generate multiple candidate IaC scripts (e.g., potential executable IaC) based on extracted feature vectors and can perform an initial ranking of the candidate IaC scripts using a reinforcement learning model within a multi-dimensional tensor space. Each candidate IaC script can be projected onto the tensor and assigned a preliminary score based on predicted alignment with user requirements and policy criteria.

In some use cases, code validator 216 can subsequently receive candidate IaC scripts and apply machine learning models trained on syntactic correctness, policy compliance, and infrastructure configuration standards by AI training engine 224, to assign final scores and classifications. Candidate IaC scripts that meet required criteria can be designated as executable IaC, while others can be flagged for remediation or iterative improvement. When code validator 216 determines the IaC is not executable or receives negative feedback from the user, code generation platform 208 can analyze the tensor dimensions influencing this outcome and assigns a penalty to the corresponding reinforcement learning model trained by AI training engine 224. Conversely, approval signals from successful validation or user acceptance result in positive rewards (e.g., high scores). Over time, code generation platform 208 can retrain the AI/ML models using augmented data derived from new interactions and deployment results, thereby improving both code generation accuracy and success rates in subsequent iterations.

In some use cases, artifact processor 212 can be trained on a dataset comprising multiple prior IaC configurations, annotated with infrastructure type, parameter sets, deployment outcomes (e.g., success/failure), error logs, remediation actions, and user feedback. AI training engine 224 can use the dataset to retrain artifact processor 212 to learn correlations between input features and positive deployment outcomes. Code validator 216 can similarly be trained by the AI training engine 224 using IaC code snippets, validation rule results, and compliance standards, which enable automated classification of code validity and executable status.

In some use cases, one or more user devices can be connected to code generation platform 208 through a network. User devices can include service entity devices, provider devices, and/or customer devices, as well as various intermediary devices. Example service entities include entities that operate and/or manage, at least in part, the code generation platform 208, such as companies that use the platform to optimize code generation (e.g., automate the generation, modification, validation, and deployment of IaC based on user-provided architectural diagrams). By continuously learning from user interactions and adapting to changing preferences, the code generation platform 208 can refine its code generation optimization and agent orchestration operations, driving improved outcomes for both service entities and users.

In some use cases, artifact processor 212 can use a machine learning model to parse data provided by a user via a user interface of a user computing device. The data can include at least one diagram comprising a set of nodes, connectors, and metadata sufficient to derive a set of parameters. The set of parameters can include entity types, attributes, or relationships that correspond to infrastructure components for generating IaC. Code generator 214 can use a machine learning model to generate the IaC using the set of parameters generated by the artifact processor 212 by processing the artifact set. Code validator 216 can use a machine learning model to process the IaC by determining syntactic validity of the IaC, determining compliance with one or more reference infrastructure configuration standards, and classifying the IaC as executable IaC or non-executable IaC based on the syntactic validity of the IaC and the compliance with one or more predefined infrastructure configuration standards.

In some use cases, artifact processor 212 can employ machine learning models such as computer vision and natural language processing to parse user-provided data comprising multimodal and visual artifacts. For example, when a user submits a diagram, such as a network topology or architecture blueprint, artifact processor 212 can apply a computer vision model (e.g., a convolutional neural network) to detect nodes, connectors, shapes, and labels within the image. Detected visual elements are mapped to corresponding textual descriptions using optical character recognition (OCR) and feature extraction algorithms. Artifact processor 212 can then structure the recognized objects, attributes, and relationships into machine-interpretable format, associating diagram components with infrastructure entities and generating annotated metadata for downstream processing. This approach can enable code generation platform 208 to automatically interpret and convert visual, multimodal, or textual artifacts into the foundational data required for IaC generation.

In some use cases, upon processing input artifacts, artifact processor 212 can generate a set of parameters by transforming raw data into structured representations. For example, textual descriptions extracted via computer vision are passed through a natural language processing pipeline, where the textual description is segmented into tokens using tokenization algorithms. These tokens are analyzed using classification models (e.g., support vector machines or neural networks trained on infrastructure ontology) to determine whether each token or phrase corresponds to an entity type (e.g., "virtual machine" or "database"), attribute (e.g., "CPU count" or "storage size"), or relationship (e.g., "connected to" or "depends on"). Segmentation, tagging, and entity linking techniques can ensure accurate mapping between user-supplied artifacts and IaC parameter sets, enabling precise and context-aware code generation in later workflow stages of code generation platform 208.

In some use cases, code generator 214 can utilize machine learning models (e.g., transformer-based language models or encoder-decoder architectures) to synthesize IaC from the structured parameter set. For example, code generator 214 can process the structured parameter set by first encoding configuration variables and resource requirements into a tokenized sequence. The tokenized sequence is then input to a transformer-based language model trained on large collection of existing IaC code and best practices. The transformer-based language model can predict resource block templates, provider syntax, and variable declarations corresponding to the target cloud environment. Code generation platform 208 can support user-supplied configuration options, including the choice of IaC language (e.g., Terraform HCL (HashiCorp Configuration Language), AWS CloudFormation, Azure ARM), preferred resource types, naming conventions, and code modularity preferences. Given these inputs, code generator 214 can infer best-practice representations, translate parameters into provider-specific resource blocks or modules, and assemble variable declarations, outputs, provider configurations, and state management code as required. For example, code generator 214 can evaluate each parameter in the structured set to identify the corresponding cloud resource type and its configuration attributes. Code generation platform 208 can reference an internal mapping or ontology of cloud provider syntax and best-practice templates. Using output from the machine learning model, code generator 214 selects and customizes appropriate resource blocks, dynamically inserts derived variables and outputs, and applies organization-specific naming conventions or modularization standards. Post-processing filters or model-in-the-loop techniques can be employed to optimize the generated code for readability, compliance, and reusability according to user and organizational preferences.

In some use cases, for validation, code validator 216 can implement a machine learning model enhanced with RAG techniques. When code validator 216 evaluates the syntactic validity and configuration compliance of an IaC file, code validator 216 can apply either or both automated parsing and static analysis algorithms. Furthermore, code validator 216 can reference a corpus that includes infrastructure standards, provider documentation, best-practices dictionaries, and compliance rulesets. In some implementations, the corpus is dynamically indexed. When using RAG, code validator 216 can actively query the corpus to retrieve specific definitions or rules relevant to the submitted IaC such as a list of required attributes for each detected resource type and a set of allowed configuration values per provider specifications. Code validator 216 can then integrate the retrieved requirements into an error-checking process by comparing the content and structure of the IaC unit against the externally sourced standards. When code validator 216 detects any missing attributes, unsupported values, or other non-compliances, code validator 216 can generate explicit error messages or suggested corrections. Through this pipeline, code validator 216 can classify the IaC as "executable" or "non-executable" and provides the user or subsequent agents with detailed, actionable validation feedback.

For example, code validator 216 classifies the IaC as executable IaC. When the IaC is executable, deployment engine 218 can transmit the executable IaC to a set of computing systems (e.g., one or more cloud services). To continue the example, code validator 216 classifies the IaC as non-executable IaC. When the IaC is non-executable, deployment engine 218 cannot transmit the non-executable IaC to a set of computing systems. Instead, the code generation platform 208 can configure artifact processor 212 to receive the non-executable IaC from the code validator 216.

The non-executable IaC can include at least one error indicator such as a message identifying one or more conditions to be corrected or additional data to be provided by the user to convert the non-executable IaC to executable IaC. Artifact processor 212 can extract at least one error indicator from the non-executable IaC to transmit to the user computing device (e.g., device the user uses to interact with the platform). The user can provide user instructions via the user interface for the one or more conditions to be corrected and the additional data to convert the non-executable IaC to executable IaC. For example, the user instructions can include clarification of resource requirements (e.g., specifying the storage size for a database 210, defining minimum CPU or memory allocations for a virtual machine), values required for the set of parameters (e.g., entering a network subnet address or a security group identifier), selection of resource types or configurations (e.g., choosing whether to deploy a Linux or Windows virtual machine, selecting the type of storage account between standard or premium, or defining the region or availability zone for deployment), clarification of intended relationships between infrastructure components (e.g., associating a virtual machine with a specific subnet or linking database 210 to a web application), or approval for modification of system-provided suggestions to the non-executable IaC. After receiving instructions from the user, artifact processor 212 can transmit the non-executable IaC, the at least one error indicator, and the user instructions to code generator 214. Code generator 214 can generate an updated IaC by using the machine learning model to process, using the non-executable IaC, the at least one error indicator and the user instructions. Code generation platform 208 can orchestrate code generator 214 to iteratively modify the updated IaC until code validator 216 classifies the updated IaC to executable IaC.

In some use cases, AI agent 222 can employ one or more artificial intelligence or machine learning techniques (e.g., neural networks and deep learning algorithms) to support agentic operations within the IaC automation workflow. Upon receiving user-provided input instructions-such as build, change, or deployment requests issued through a chat interface or API endpoint-AI agent 222 utilizes NLP and machine learning models to interpret and structure these instructions for downstream agents. By converting natural language requests into formalized modification parameters or actions, AI agent 222 enables subsequent components (such as the extract, validate, and update agents) to analyze, generate, and modify IaC units. The AI agent 222 can also facilitate agent-to-agent coordination, monitor agentic handoffs, and recommend or automate code changes based on established infrastructure best practices, compliance policies, or prior successful modification patterns.

The AI training engine 224 can train and optimize the AI models used by the code generation platform 208, using large datasets and machine learning algorithms to improve model accuracy and effectiveness. The AI training engine 224 can use techniques such as reinforcement learning, supervised learning, and unsupervised learning to train AI models. For example, the AI training engine 224 can use reinforcement learning to train a model that predicts the most effective communication channels for customer interactions. The model can receive rewards or penalties based on customer responses, such as opening emails or responding to SMS messages. The input features collected by the agents, such as user instructions, user context, conversation history, and sentiment analysis, can be used to train the model. For example, the agents can collect features such as user ID, message content, and user response, which can be used to train the model to predict the most effective code generation for future interactions. By continuously training and updating AI models using reinforcement learning and other techniques, the AI training engine 224 can ensure that the code generation platform 208 remains up-to-date and effective, even as customer behavior and preferences evolve over time. The AI training engine 224 can also use model pruning and knowledge distillation to optimize model performance and efficiency, ensuring that the models are lightweight and scalable for deployment in the code generation platform 208.

In some use cases, code generation platform 208 can also use application-specific integrated circuits (ASICs) designed to implement neural networks, such as neuromorphic chips that utilize neurons as memory units. These ASICs can mimic the behavior of biological neurons, enabling efficient and scalable implementation of neural networks. By using neurons as memory units, these ASICs can store and process information in a highly parallelized and distributed manner, reducing the need for traditional memory access and retrieval. This can result in significant improvements in processing speed, power efficiency, and scalability, making them well-suited for demanding applications such as real-time natural language processing, computer vision, and predictive analytics. The use of ASICs with neurons as memory units can enable the code generation platform 208 to efficiently process complex neural networks, including recurrent neural networks (RNNs), convolutional neural networks (CNNs), and long short-term memory (LSTM) networks. This can enable the platform to perform advanced tasks such as speech recognition, sentiment analysis, predictive modeling, and to provide personalized and context-aware communications to users. By using these specialized hardware elements, the code generation platform 208 can deliver high-performance and efficient processing of complex data sets to enable a wide range of applications and use cases.

The software, firmware, and/or hardware elements, such as those described herein, can implement various logics, agents, modules, or engines of the code generation platform 208. Such modules can include, for example, an artifact processor 212, a code generator 214, a code validator 216, a deployment engine 218, an AI agent 222, and/or an AI training engine 224. As used herein, the term "set" refers to a physical or logical collection of objects, which can contain no objects (e.g., a null set, an empty set), one object, or two or more objects. The terms "engine," "application," "program," "circuit," and "executable" refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations, as defined by parametrized functions, specific configuration settings, special-purpose code, and/or the like. Engines, applications, programs, and executables can generate and/or receive various electronic messages.

Agentic Infrastructure Examples

Figure 3:
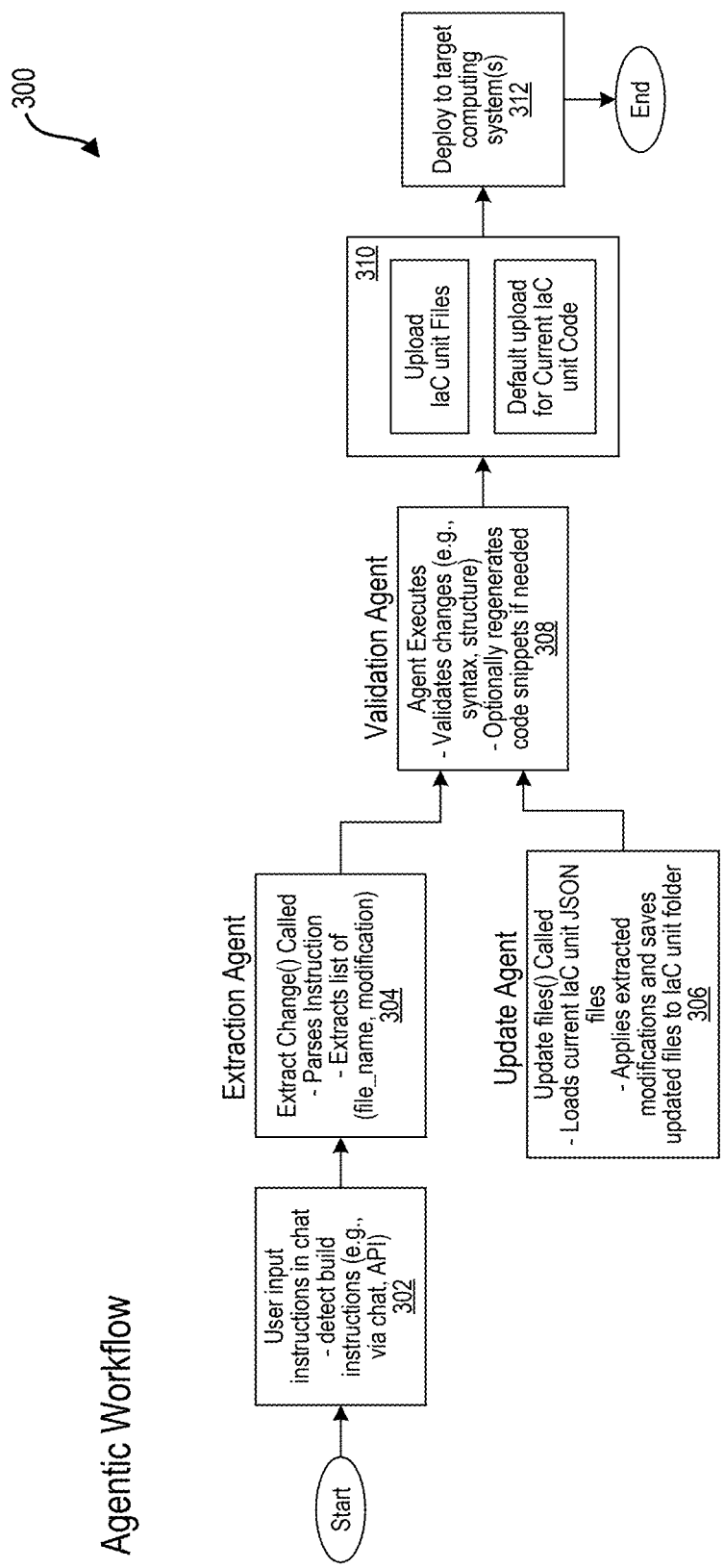
FIG. 3 illustrates an example of the agentic architecture workflow for detection, extraction, validation, code generation, and deployment of infrastructure configurations using multi-agent orchestration, in accordance with the present technology.

FIG. 3 illustrates an example of the agentic architecture workflow of system 300 for detection, extraction, validation, code generation, and deployment of infrastructure configurations using multi-agent orchestration, in accordance with the present technology. In some implementations, the agentic architecture workflow can be used to deploy a new build.

In some implementations, the agentic architecture workflow can be used to generate code for making changes to an existing build.

In some implementations, the agents (e.g., conversational, extract, update, validate, and deployment) illustrated in FIG. 3 can correspond to and are embodied by the modular components of the code generation platform 208, as depicted in FIG. 2. For example, the conversational agent and extraction agent of FIG. 3 are implemented by the artifact processor 212 of FIG. 2, which can include one or more processors, memory units, and computer-executable instructions configured to receive, parse, and interpret user-provided infrastructure instructions. The update agent of FIG. 3 can correspond to code generator 214 in FIG. 2, utilizing underlying computational resources and machine learning models to generate or modify IaC unit files as specified by the extracted modifications (e.g., set of parameters derived from user input). The validation agent of FIG. 3 can be implemented by code validator 216 in FIG. 2, which executes syntactic, structural, and standards compliance checks on the generated or updated IaC code. The deployment agent in FIG. 3 can be implemented by deployment engine 218 in FIG. 2, including logic for uploading validated IaC unit files and orchestrating deployment to target computing systems. Each agent can include, or be executed by, one or more processors and memory elements, and leverages computer-executable instructions such as those invoking AI or ML models and other processing logic to perform its designated operations within the overall agentic workflow.

At 302, system 300 can configure a conversational agent to detect IaC build instructions. The conversational agent can actively monitor input channels, such as a chat user interface or an exposed API endpoint, to detect infrastructure provisioning commands or modification requests issued by a user. The user interface can be accessed by the user via a user computing device (e.g., mobile phone, laptop, desktop, or VR headset). The conversational agent can capture the instructions (e.g., from user or another agent) for further processing. For example, an engineer with the appropriate credentials for interacting with system 300 can open the chat interface and enter, "Provision a virtual network with three subnets and a managed Azure SQL database," or an external pipeline API triggers a "scale-out web tier" event.

At 304, system 300 can configure the extraction agent to parse and interpret the detected instructions. The extraction agent can call an operation (as illustrated Extract Changes( )), leveraging a machine learning model to parse the intent and content of the instructions. The extraction agent can generate a structured list of modifications, each comprising a file name, modification, tuple, or equivalent operation. This list formalizes which components, resources, or configurations in the IaC artifacts require generating, updating, or deleting. For example, upon parsing the user instructions (e.g., "Add an Azure Cognitive Search service and attach to the web app"), the extraction agent can determine which IaC file(s) or module(s) should be updated to incorporate the requested change, formalize and specify the exact resource block(s) required by the target computing system(s) (e.g., generating a block with proper parameters), and generate and integrate the corresponding output or export code (e.g., output variable blocks exposing the new resource's identifiers or endpoints) into the appropriate IaC files to ensure the new resource is not only created but also accessible for downstream use and properly integrated into the existing IaC codebase.

At 306, system 300 can configure the update agent (also known as coding agent in other systems) to generate or update the IaC unit. The update agent can receive the modification list (e.g., user instructions) from the extraction agent and applies a language model to synthesize corresponding code blocks or configuration changes within one or more IaC units (e.g., files or modules). The update agent can structure the output to comply with the best practices and dependencies, generating new IaC units or amending existing IaC units, as necessary. The update agent can generate new IaC units by adding entirely new definitions for required infrastructure resources into the IaC codebase. For example, the coding agent ingests the modification request and renders a new resource definition for Azure Cognitive Search in an HCL IaC unit, along with variable declarations, outputs, and any required provider blocks. The update agent can amend existing IaC units by modifying IaC definitions for resources that already exist, adjusting their properties, relationships, or configuration as required by the detected user instructions. For example, if the user instructions ask to increase an existing virtual machine's size, the agent updates the relevant resource definition in the IaC file to reflect the new size.

In some implementations, the agentic architecture can be capable of automatically detecting resource requirements and constraints from user-provided instructions or contextual input artifacts. For example, when a user issues a high-level instruction requesting deployment of a web application, the extraction agent and update agent can employ machine learning models to infer implicit resource requirements (e.g., recommended virtual machine size based on projected user traffic), or appropriate storage capacity considering anticipated data load. The update agent can then generate IaC code that incorporates these inferred requirements and constraints by generating optimal configuration values (e.g., virtual machine size, storage tier, database instance class) in accordance with provider best practices or organizational policies. This enables the update agent to synthesize infrastructure code that not only matches the explicit directives specified by the user, but also accounts for underlying performance, scalability, and compliance objectives without requiring the user to specify granular parameters. As a result, system 300 can produce IaC that is both tailored and dependable under variable conditions, maximizing deployment efficiency and reducing the likelihood of misconfiguration due to omitted details from the user instructions.

At 308, system 300 can configure the validation agent to evaluate the generated or updated IaC unit. The validation agent can perform comprehensive checks, including syntactic validation, schema consistency, and compliance against reference infrastructure configuration standards. The validation agent can then classify the IaC unit as either executable or non-executable, providing a set of error indicators or compliance violations when applicable. For example, the validation agent can parse the generated IaC, detect a missing required property or identify a configuration inconsistency (e.g., an undefined variable or an invalid parameter for a resource block), and flag the configuration as non-executable. The validation agent can then return an error message such as "A required field for the resource definition is missing."

Furthermore, at 308, system 300 can configure the conversational agent to transmit the results of the validation and any error indicators or suggestions from the validation agent, back to the user via the user interface, or to the originating agent or API process. When the validation agent confirms the code as executable, the conversational agent notifies the user that deployment is ready and solicits any required approval. In the event of non-executable code, the conversational agent communicates specific error indicators and provides suggestions or correction hyperlinks. For example, the conversational agent outputs to the user, "Validation failed, Please specify a valid Stock Keeping Unit (SKU) for your search service," in the chat window, or logs this result to a DevOps dashboard for automated remediation triggers.

At 310, system 300 can configure a deployment agent to upload the validated or updated IaC unit files. The update agent can transfer the validated or updated IaC unit containing the IaC code to a storage location or artifact repository in preparation for deployment. For example, after successful validation, the deployment agent can upload the IaC unit to a default storage location or central repository where versioning and subsequent operations such as deployment can take place.

At 312, system 300 can configure the deployment agent to deploy the validated, executable IaC unit to the designated target computing system(s), such as cloud environments or private datacenters. The deployment agent can manage the handoff, initiate the pipeline process for infra provisioning, and monitor the deployment lifecycle, relaying deployment status and version tracking information. For example, after the IaC unit passes validation checks, the deployment agent deploys the infrastructure code to the designated computing environment (e.g., cloud provider or on-premises infrastructure). The deployment agent then applies the code to provision the specified infrastructure (e.g., networks, virtual machines, databases, or storage resources) as described by the IaC unit. Upon completion, the deployment agent reports the deployment status, including any successes, errors, or issues encountered, back to the user interface or system log for visibility and possible follow-up actions.

Example Methods of Operation

Figure 4:
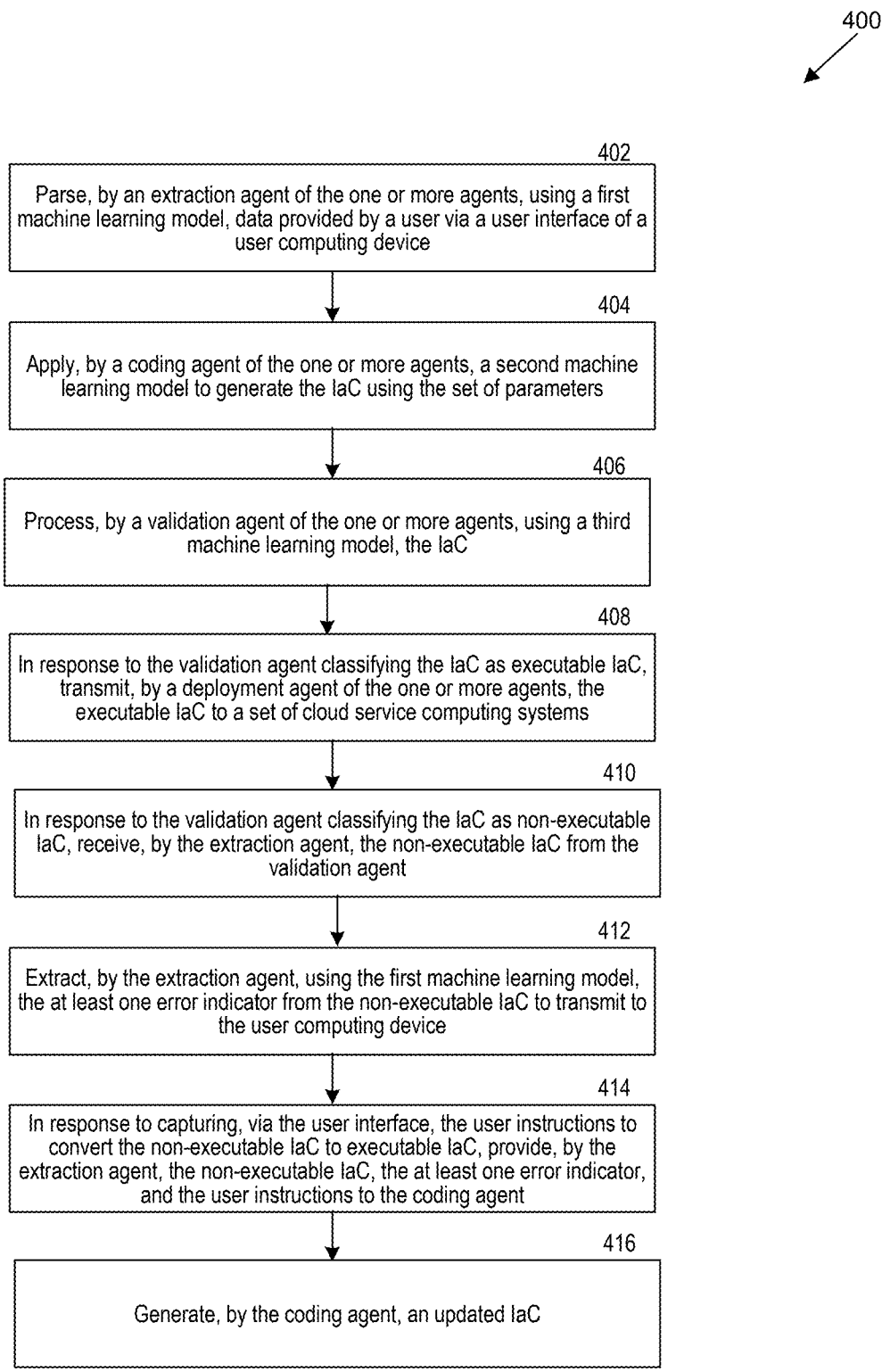
FIG. 4 is a flowchart illustrating the process of a system for automatically generating, validating, and deploying IaC executables using multi-agent architecture in accordance with the one or more implementations.

FIG. 4 is a flowchart illustrating the process that system 400 uses for automatically generating, validating, and deploying IaC executables using multi-agent architecture in accordance with the one or more implementations.

At 402, system 400 can configure the extraction agent to parse user-provided data via a user interface of a user computing device. The extraction agent can use a first machine learning model to analyze the data provided by the user and extract relevant information for generating the IaC. The data can include at least one diagram with a set of nodes, connectors, and metadata sufficient to derive parameters such as entity types, attributes, or relationships that represent infrastructure components for IaC generation. For example, the user can upload an architecture diagram through the web-based user interface (UI). The extraction agent can interpret the architecture diagram and identify the appropriate parameters for downstream code generation.

At 404, system 400 can configure the coding agent to apply a second machine learning model for generating IaC. The coding agent can receive the parameters such as entity types, attributes, or relationships extracted by the extraction agent and utilizes the same or an associated machine learning model to synthesize the initially generated IaC (e.g., Terraform configuration files representing the architecture described in the uploaded diagram). For example, the coding agent can generate resource blocks for all identified compute and storage entities, configuring providers and variables accordingly.

At 406, system 400 can configure the validation agent to process the generated IaC using a third machine learning model. The validation agent can determine the syntactic validity of the IaC, evaluate compliance with reference infrastructure configuration standards, and classify the IaC as executable or non-executable. For example, the validation agent can check the generated Terraform code for parsing errors and confirms that the resource types, relationships, and attribute values align with enterprise policy and security standards.

At 408, when the validation agent determines that the IaC is executable, system 400 can configure the deployment agent to transmit the executable IaC to a set of cloud service computing systems for deployment. The deployment agent can identify target cloud service computing systems (e.g., AWS, Azure, or GCP) from the IaC configuration and trigger corresponding provisioning workflows to instantiate the defined infrastructure. For example, the deployment agent can log a job in the pipeline system and provide status updates as infrastructure resources are created in the public cloud.

At 410, when the validation agent determines that the IaC is non-executable, system 400 can configure the extraction agent to receive the non-executable IaC along with one or more error indicators from the validation agent. Each error indicator can include a message identifying issues or missing information required to convert the non-executable IaC into executable IaC. For example, the validation agent can return a message indicating a missing value for a required variable or an unsupported configuration parameter.

At 412, system 400 can configure the extraction agent to extract, using the first machine learning model, error indicators (e.g., message providing information on the error(s) causing the non-executable code) from the non-executable IaC and transmit the extracted error indicators to the user interface of the user computing device. The error indicators can prompt the user to review issues such as undefined variables, conflicts, or non-compliant settings and provide clarifications or missing details. For example, system 400 can display a prompt requesting the user to specify the size of a compute instance or select between storage classes.

At 414, system 400 can configure the extraction agent to capture user instructions through the user interface to resolve one or more of the error conditions identified by the validation agent. User instructions can include clarification of resource requirements, values for parameters, selection of resource types or configurations, clarification of intended relationships between infrastructure components, or approval for modifications suggested by system 400. For example, the user can enter a value for a previously undefined variable and confirm use of a system-proposed network setting to address the reported error.

At 416, following user input, system 400 can configure the extraction agent to provide the non-executable IaC, the error indicators, and the user-provided instructions to the coding agent. The coding agent can then generate the updated IaC using the machine learning model, reflecting all corrections and new data provided by the user. The agents (e.g., extraction agent, coding agent, validation agent) can iteratively modify and validate the IaC until the validation agent classifies the updated code as executable. For example, system 400 can reprocess the updated IaC configuration, repeating validation and correction cycles as needed, and upon validation success, the deployment agent can deploy the executable IaC to the set of cloud service computer systems.

In some implementations, each agent in system 400 such as the extraction agent, coding agent, validation agent, and deployment agent can use a dedicated machine learning model optimized for each agent's specialized operations. For example, the extraction agent may utilize a natural language processing (NLP) model, such as a transformer-based language model (e.g., BERT or GPT), to interpret user instructions and extract relevant parameters from textual and diagram inputs. The coding agent can employ a code generation model, such as Codex or CodeT5, trained to synthesize infrastructure-as-code (IaC) scripts in response to structured prompts and architecture specifications. The validation agent may rely on a static code analysis or anomaly detection model, such as a graph neural network (GNN) for structural code evaluation or a classification model to flag syntax errors and compliance issues. The deployment agent can incorporate a reinforcement learning model or a decision tree-based policy model to optimize deployment strategies, handle environment selection, and manage rollbacks or error recovery based on previous deployment data. By assigning distinct machine learning models to each agent, the system further enhances accuracy, compliance, and adaptability throughout the entire automated IaC generation, validation, and deployment process.

In some implementations, system 400 can configure the coding agent to generate the IaC to include one or more of a provider set, resource set, module set, state set, variable set, or output set.

In some implementations, system 400 can configure the extraction agent to generate a storage resource identifier for a storage resource and at least one storage resource property of the storage resource by using the metadata extracted by the extraction agent from data input by the user. System 400 can bind the storage resource identifier and the at least one storage resource property to a portion of the IaC that specifies the storage resource.

In some implementations, system 400 can configure the extraction agent to generate, using the metadata extracted by the extraction agent from the data input by the user, a compute resource identifier for a compute resource and at least one compute resource attribute of the compute resource, the at least one compute resource attribute specifying an instance type. System 400 can bind the compute resource identifier and the instance type to a portion of the IaC associated with the compute resource.

In some implementations, system 400 can configure the extraction agent to generate, using the metadata extracted by the extraction agent from the data input by the user, a relationship between the compute resource and the storage resource. System 400 can bind the relationship to the portion of the IaC associated with mapping the compute resource and the storage resource.

In some implementations, system 400 can configure the deployment agent to generate an identifier for a particular version of the IaC generated by the coding agent. The identifier can include a nomenclature and a timestamp for the particular version of the IaC for tracking. The deployment agent can store the particular version of the IaC with the identifier in a storage resource. The deployment agent can track the particular version of the IaC with the identifier in the storage resource. Tracking the particular version of the IaC can enable the user to select, via the user interface, a version from each version of the IaC in the storage resource to retrieve or redeploy by the deployment agent.

In some implementations, system 400 can generate at least one of a suggested correction or a hyperlink to a resource to assist the user in resolving identified issues for the non-executable IaC. System 400 can populate the at least one error indicator with at least one of the generated suggested correction or hyperlink.

In some implementations, system 400 can configure the deployment agent to coordinate operations of the extraction agent, coding agent, and validation agent. The coordinating done by the deployment agent can include the following: invoking the extraction agent to extract the set of parameters from the data provided by the user via the user interface of the user computing device, providing the extracted set of parameters to the coding agent to generate the IaC, transmitting the generated IaC to the validation agent for validation by classifying the IaC as executable IaC or non-executable IaC, and in response to the validation agent classifying the IaC as executable IaC, initiating deployment of the executable IaC to the set of cloud service computing systems.

In some implementations, in response to the validation agent classifying the IaC as non-executable IaC, system 400 can configure the deployment agent to coordinate the operations of the extraction agent, coding agent, and validation agent to iteratively modify the non-executable IaC until the validation agent classifies the updated IaC to executable IaC. The deployment agent can route error indicators and user instructions to the coding agent for iterative modification of the non-executable IaC.

Example AI/ML Architecture

Figure 5:
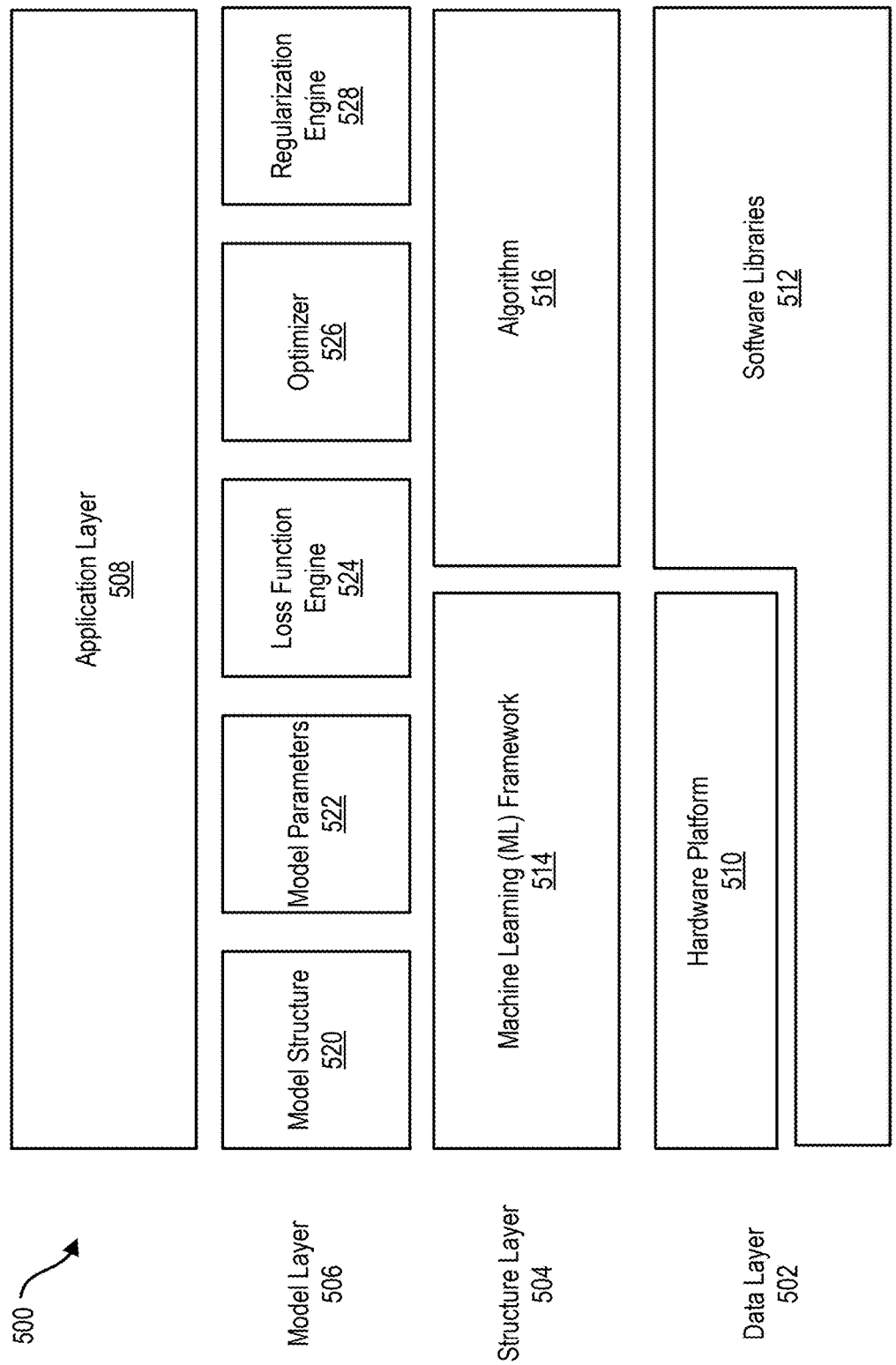
FIG. 5 is a block diagram illustrating an example artificial intelligence/machine learning (AI/ML) stack of the code generation platform, according to some arrangements.

FIG. 5 is a block diagram illustrating an example artificial intelligence/machine learning (AI/ML) stack 500 of the code generation platform 208 of FIG. 2, according to some arrangements. According to various implementations, the AI/ML stack 500 can include AI/ML models, such as computer vision models, reinforcement learning based models, classification models, large agent models, small agent models, or additional AI/ML models.

As shown, the AI/ML stack 500 can include a set of layers, which conceptually organize elements within an example network topology for the AI system's architecture to implement a particular AI model. Generally, an AI model is a computer-executable program implemented by the AI/ML stack 500 that analyzes data to make predictions. Information can pass through each layer of the AI/ML stack 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The loss function engine 524, optimizer 526, and regularization engine 528 work to refine and optimize the AI model, and the data layer 502 provides resources and support for application of the AI model by the application layer 508.

The application layer 508 can include, in whole or in part, executables included in an application that enables users to access and interact with the platform (such as, for example, user interfaces). In some implementations, the application layer 508 can provide graphical or conversational interfaces through which users can import artifacts (e.g., diagrams, configuration files, or requirements documents) directly from the user computing devices. Upon import, the application layer 508 can initiate processing workflows whereby users can invoke the generation of IaC, review and iteratively refine generated code in response to system-provided validation results or error messages and control the deployment of finalized IaC to designated cloud or on-premises environments. The application layer 508 can also support visualization of infrastructure topologies, code diffing between iterations, and streamlined approval processes, thereby enabling users to efficiently advance from design through code generation to auditable deployment within a unified interface.

The data layer 502 acts as the foundation of the AI/ML stack 500 by preparing data for the AI model. As shown, the data layer 502 can include two sub-layers: a hardware platform 510 and one or more software libraries 512. The hardware platform 510 can perform operations for the AI model and include computing resources for storage, memory, logic, and networking. The hardware platform 510 can perform backend operations such as matrix calculations, parallel calculations, machine learning (ML) training, and the like. Examples of components used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 510 can include Infrastructure as a Service (IaaS) resource, which are computing resources (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of as suites of data and programming code, including executables, used to control the computing resources of the hardware platform 510. The programming code can include low-level primitives (e.g., fundamental language elements) that form the foundation of one or more low-level programming languages, such that the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI/ML stack 500 include Intel Math Kernel Library, Nvidia cuDNN, Eigen, and Open BLAS.

The structure layer 504 can include an ML framework 514 and one or more of an algorithm 516. The ML framework 514 can be thought of as an interface, library, or tool that enables users to build and deploy the AI model. The ML framework 514 can include an open-source library, an application programming interface (API), a gradient-boosting library, an ensemble method, and/or a deep learning toolkit that can work with the layers of the AI system to facilitate development of the AI model. For example, the ML framework 514 can be invoked to distribute processes for application or training of the AI model across multiple resources in the hardware platform 510. The ML framework 514 can also include a set of pre-built components that have the functionality to implement and train the AI model and enable users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI/ML stack 500 include TensorFlow, PyTorch, Scikit-Learn, Keras, Cafffe, LightGBM, Random Forest, and AWS.

The algorithm 516 can be an organized set of computer-executable operations used to generate output data from a set of input data and can sometimes be described using pseudo-code. The algorithm 516 can include complex code that allows the computing resources to learn from new input data and create new/modified outputs based on what was learned.

The algorithm 516 can build the AI model through being trained (e.g., via a model training engine, which can include a user interface having controls sufficient to enable a user to interact with the model, label data, and so forth) while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

The model layer 506 can implement the AI model using data from the data layer 502 and the algorithm 516 and ML framework 514 from the structure layer 504, thus enabling decision-making capabilities of the AI/ML stack 500. The model layer 506 can include any of a model structure 520, model parameters 522, a loss function engine 524, an optimizer 526, and a regularization engine 528.

The model structure 520 describes the architecture of the AI model of the AI/ML stack 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how the node converts data received to data output. The structure layers can include an input layer of nodes that receive input data and an output layer of nodes that produce output data. The model structure 520 can include one or more hidden layers of nodes between the input and output layers. The model structure 520 can be an artificial neural network (or, simply, neural network) that connects the nodes in the structured layers such that the nodes are interconnected. Examples of neural networks include feedforward neural networks, convolutional neural networks (CNNs), recurrent neural networks (RNNs), Autoencoder, Variational Autoencoder (VAE), and Generative Adversarial Networks (GANs).

The model parameters 522 represent the relationships learned by a model during training and can be used to make predictions and decisions based on input data. The model parameters 522 can weight and bias the nodes and connections of the model structure 520. For example, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be automatically determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function can be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 526 used can be determined based on the type of model structure 520 and the size of data and the computing resources available in the data layer 502.

The regularization engine 528 executes regularization operations. Regularization is a technique that prevents over- and underfitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constrain the resulting AI model and improves its ability for generalized application. Examples of regularization techniques include lasso (L1) regularization, ridge (L2) regularization, and elastic (L1 and L2 regularization).

Example Transformer for Machine Learning Models

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer") and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks and there can be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, compared with models with fewer layers. In the present disclosure, the term "ML-based model" or more simply "ML model" can be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset can be a collection of text documents, referred to as a text corpus (or simply referred to as a corpus). The corpus can represent a language domain (e.g., a single language), a subject domain (e.g., scientific papers), and/or can encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or can be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value output by the ML model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set can be split into three mutually exclusive subsets: a training set, a validation (or cross-validation) set, and a testing set. The three subsets of data can be used sequentially during ML model training. For example, the training set can be first used to train one or more ML models, each ML model, e.g., having a particular architecture, having a particular training procedure, being describable by a set of model hyperparameters, and/or otherwise being varied from the other of the one or more ML models. The validation (or cross-validation) set can then be used as input data into the trained ML models to measure the performance of the trained ML models and/or compare performance between them. Where hyperparameters are used, a new set of hyperparameters can be determined based on the measured performance of one or more of the trained ML models, and the first step of training (i.e., with the training set) can begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) can begin. The output generated from the testing set can be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training can be carried out iteratively until a convergence condition is met (e.g., a predefined maximum number of iterations has been performed, or the value output by the ML model is sufficiently converged with the desired target value), after which the ML model is considered to be sufficiently trained. The values of the learned parameters can then be fixed, and the ML model can be deployed to generate output in real-world applications (also referred to as "inference").

In some examples, a trained ML model can be fine-tuned, meaning that the values of the learned parameters can be adjusted slightly in order for the ML model to better model a specific task. Fine-tuning of an ML model typically involves further training the ML model on a number of data samples (which can be smaller in number/cardinality than those used to train the model initially) that closely target the specific task. For example, an ML model for generating natural language that has been trained generically on publicly available text corpora can be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It can be noted that, while the term "language model" has been commonly used to refer to an ML-based language model, there could exist non-ML language models. In the present disclosure, the term "language model" can be used as shorthand for an ML-based language model (i.e., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model can comprise hundreds of thousands of learned parameters or in the case of a large language model (LLM) can comprise millions or billions of learned parameters or more. As non-limiting examples, a language model can generate text, translate text, summarize text, answer questions, write code (e.g., Phython, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text inputs). Although transformer-based language models are described herein, it should be understood that the present disclosure can be applicable to any ML-based language model, including language models based on other neural network architectures such as recurrent neural network (RNN)-based language models.

Figure 6:
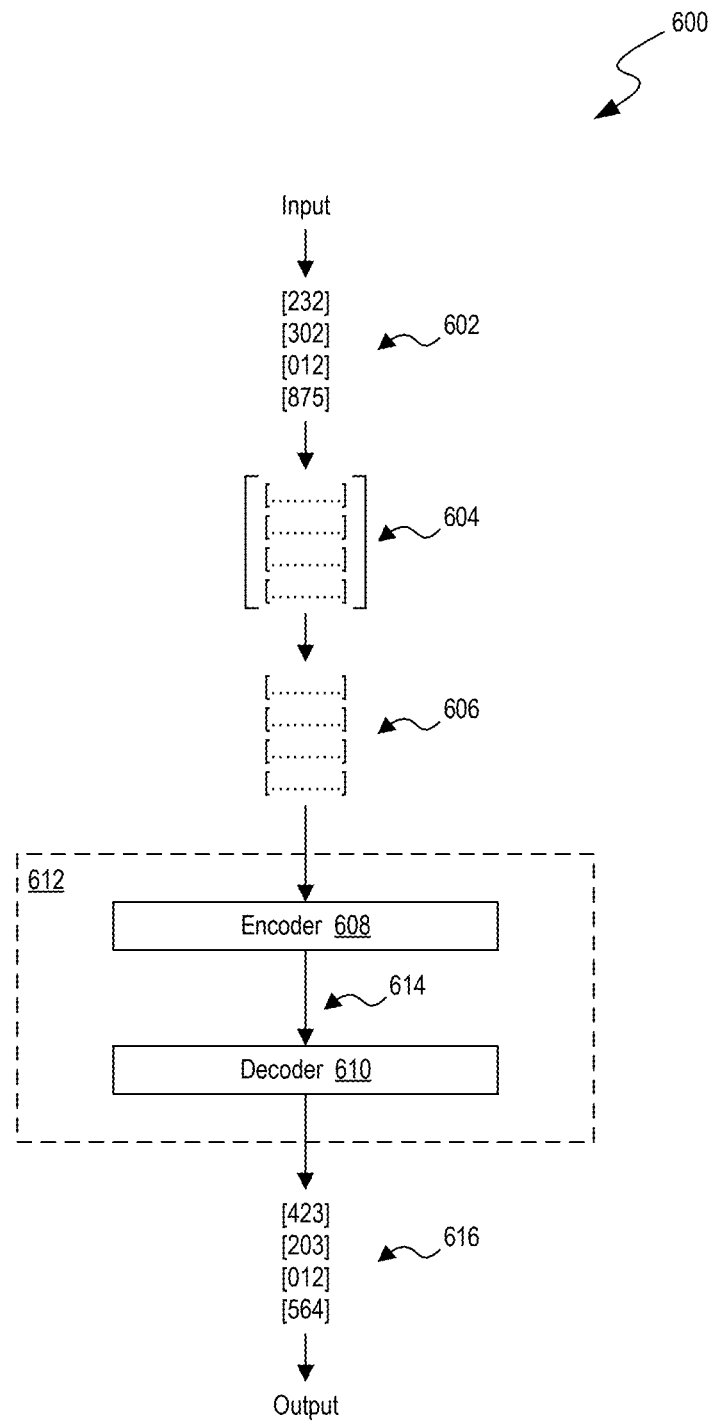
FIG. 6 is a block diagram of an example transformer that can implement aspects of the present technology.

FIG. 6 is a block diagram of an example transformer 612 that can implement aspects of the present technology. For example, the transformer architecture 600 depicted in FIG. 6 can be used by modules such as the artifact processor 212 and the code generator 214 of FIG. 2 to perform natural language understanding, instruction parsing, and IaC synthesis based on user-provided artifacts. In some implementations, the code validator 216 can also employ a transformer model for structured code analysis and semantic validation, further leveraging the model's contextual reasoning capabilities to improve the accuracy and reliability of automated infrastructure provisioning.

A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure can be applicable to any machine learning (ML)-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural-language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural-language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural-language responses to natural-language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and natural language processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "one," and "summary" each correspond to, respectively, a "write" token, a "one" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token. In another example pertaining to code generation for IaC, the phrases "set up a database," "create a storage bucket," and "configure a load balancer" can be tokenized into distinct representations. The cosine similarity (or another suitable similarity measure) between the embedding for the "set up a database" token and the embedding for "initialize a datastore" might be 0.85 (or, more generally, might meet or exceed a threshold), indicating a high degree of semantic similarity, whereas the cosine similarity between the "set up a database" token and the "configure a load balancer" token might be 0.35, reflecting their relatively lower semantic correlation, and enabling more precise code generation.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., in the order of thousands or tens of thousands of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally, or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural-language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally, or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 7:
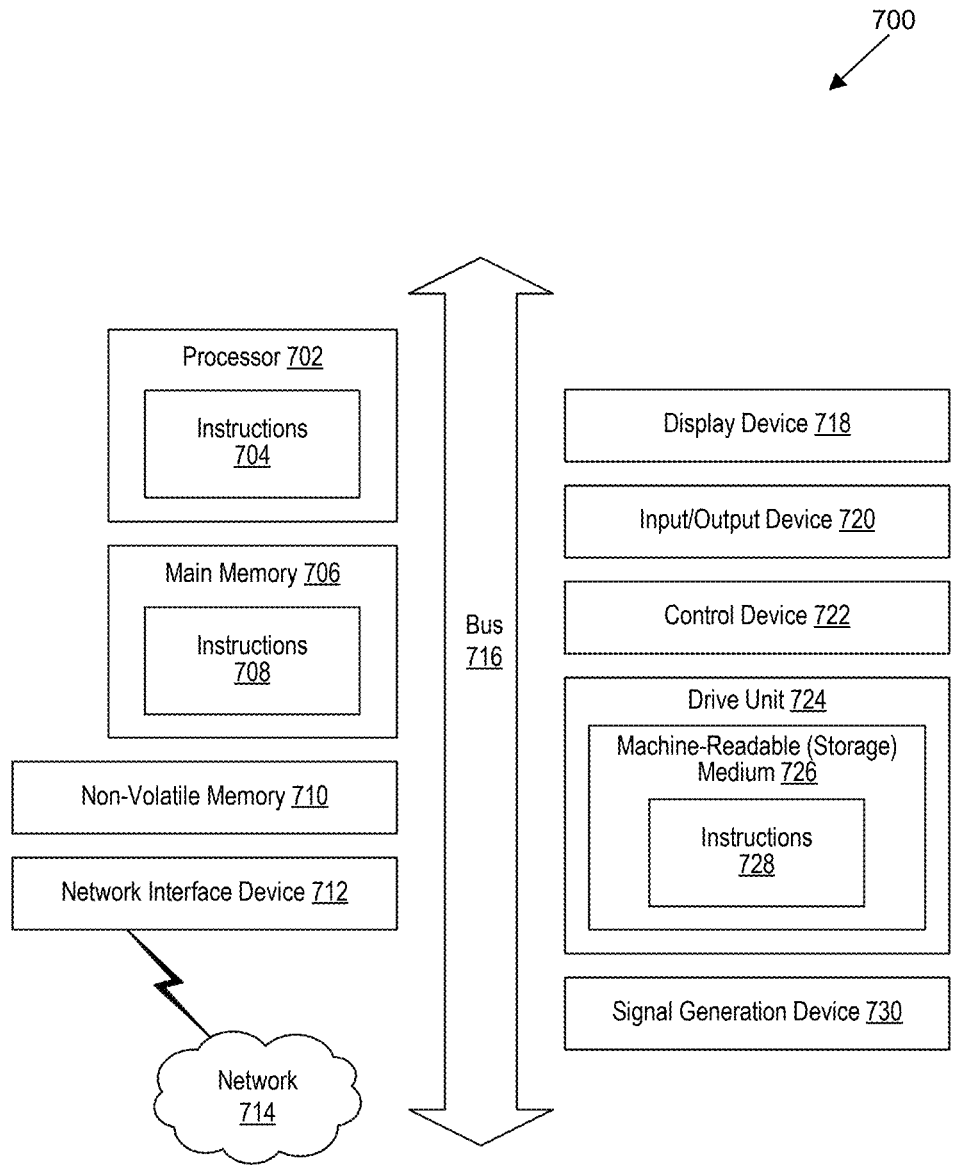
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computer-implemented method for automatically generating infrastructure-as-code (IaC) executables using artifacts processed by one or more agents in an agentic architecture, the one or more agents including a set of compute resources comprising at least one processor, at least one memory, and computer-executable instructions stored in the at least one memory and executable to perform the computer-implemented method, the computer-implemented method comprising:

parsing, by an extraction agent of the one or more agents, using a first machine learning model, data provided by a user via a user interface of a user computing device, wherein the data includes at least one diagram comprising a set of nodes, connectors, and metadata sufficient to derive a set of parameters comprising two or more of: entity types, attributes, or relationships that correspond to infrastructure components for generating the IaC;

applying, by a coding agent of the one or more agents, a second machine learning model to generate the IaC using the set of parameters;

processing, by a validation agent of the one or more agents, using a third machine learning model, the IaC by:

determining syntactic validity of the IaC, determining compliance with one or more reference infrastructure configuration standards, and classifying the IaC as an executable IaC or a non-executable IaC based on the syntactic validity of the IaC and the compliance with the one or more reference infrastructure configuration standards;

in response to the validation agent of the one or more agents classifying the IaC as the executable IaC, transmitting, by a deployment agent of the one or more agents, the executable IaC to a set of cloud service computing systems;

in response to the validation agent of the one or more agents classifying the IaC as the non-executable IaC, receiving, by the extraction agent of the one or more agents, the non-executable IaC from the validation agent of the one or more agents, wherein the non-executable IaC includes at least one error indicator comprising a message identifying one or more conditions to be corrected or additional data to be provided to convert the non-executable IaC to the executable IaC;

extracting, by the extraction agent of the one or more agents, using the first machine learning model, the at least one error indicator from the non-executable IaC to transmit to the user computing device, wherein the user provides user instructions via the user interface of the user computing device for the one or more conditions to be corrected and the additional data to convert the non-executable IaC to the executable IaC, and wherein the user instructions comprise at least one of: clarification of resource requirements, values required for the set of parameters, selection of resource types or configurations, clarification of intended relationships between infrastructure components, or approval for modification of system-provided suggestions to the non-executable IaC;

in response to capturing, via the user interface of the user computing device, the user instructions to convert the non-executable IaC to the executable IaC, providing, by the extraction agent of the one or more agents, the non-executable IaC, the at least one error indicator, and the user instructions to the coding agent of the one or more agents; and generating, by the coding agent of the one or more agents, an updated IaC, wherein the one or more agents iteratively modify the updated IaC until the validation agent of the one or more agents classifies the updated IaC to the executable IaC.

2. The computer-implemented method of claim 1, wherein the IaC generated by the coding agent of the one or more agents includes one or more of a provider set, a resource set, a module set, a state set, a variable set, or an output set.

3. The computer-implemented method of claim 1, further comprising:

generating, using the metadata extracted by the extraction agent of the one or more agents from data input at the user computing device, a storage resource identifier for a storage resource and at least one storage resource property of the storage resource; and binding the storage resource identifier and the at least one storage resource property of the storage resource to a portion of the IaC that specifies the storage resource.

4. The computer-implemented method of claim 3, further comprising:

generating, using the metadata extracted by the extraction agent of the one or more agents from the data input at the user computing device, a compute resource identifier for a compute resource and at least one compute resource attribute of the compute resource, wherein the at least one compute resource attribute of the compute resource specifies an instance type; and binding the compute resource identifier and the instance type to a portion of the IaC associated with the compute resource.

5. The computer-implemented method of claim 4, further comprising:

generating, using the metadata extracted by the extraction agent of the one or more agents from the data input at the user computing device, a relationship between the compute resource and the storage resource; and binding the relationship to the portion of the IaC associated with mapping the compute resource and the storage resource.

6. The computer-implemented method of claim 1, further comprising:

generating, by the deployment agent of the one or more agents, an identifier for a particular version of the IaC generated by the coding agent of the one or more agents, wherein the identifier includes nomenclature and a timestamp for the particular version of the IaC for tracking;

storing, by the deployment agent of the one or more agents, the particular version of the IaC with the identifier in a storage resource; and tracking, by the deployment agent of the one or more agents, the particular version of the IaC with the identifier in the storage resource, wherein tracking the particular version of the IaC enables the user to select, via the user interface, a version from each version of the IaC in the storage resource to retrieve or redeploy by the deployment agent of the one or more agents.

7. The computer-implemented method of claim 1, further comprising:

generating at least one of a suggested correction or a hyperlink to a resource to assist the user in resolving identified issues for the non-executable IaC; and populating the at least one error indicator with the generated at least one of the suggested correction or the hyperlink.

8. The computer-implemented method of claim 1, further comprising:

coordinating, by the deployment agent of the one or more agents, operations of the extraction agent, coding agent, and validation agent of the one or more agents, wherein the coordinating comprises:

invoking the extraction agent of the one or more agents to extract the set of parameters from the data provided via the user interface of the user computing device, providing the extracted set of parameters to the coding agent of the one or more agents to generate the IaC, transmitting the generated IaC to the validation agent of the one or more agents for validation by classifying the IaC as the executable IaC or the non-executable IaC, and in response to the validation agent of the one or more agents classifying the IaC as the executable IaC, initiating deployment of the executable IaC to the set of cloud service computing systems.

9. The computer-implemented method of claim 8, further comprising:

in response to the validation agent of the one or more agents classifying the IaC as the non-executable IaC, coordinating, by the deployment agent of the one or more agents, the operations of the extraction agent, coding agent, and validation agent of the one or more agents to iteratively modify the non-executable IaC until the validation agent of the one or more agents classifies the updated IaC to the executable IaC, wherein the deployment agent of the one or more agents routes error indicators and user instructions to the coding agent of the one or more agents for iterative modification of the non-executable IaC.

10. One or more non-transitory computer-readable media having computer-executable instructions stored thereon that, when executed by at least one processor of a computing system, cause the computing system to perform operations for automatically generating infrastructure-as-code (IaC) executables using artifacts processed by one or more agents in an agentic architecture, the operations comprising:

parsing, by an extraction agent of the one or more agents, using a first machine learning model, data provided by a user via a user interface of a user computing device, wherein the data includes at least one diagram comprising a set of nodes, connectors, and metadata sufficient to derive a set of parameters comprising two or more of: entity types, attributes, or relationships that correspond to infrastructure components for generating the IaC;

applying, by a coding agent of the one or more agents, a second machine learning model to generate the IaC using the set of parameters;

processing, by a validation agent of the one or more agents, using a third machine learning model, the IaC by:

determining syntactic validity of the IaC,
determining compliance with one or more reference infrastructure configuration standards, and
classifying the IaC as an executable IaC or a non-executable IaC based on the syntactic validity of the IaC and the compliance with the one or more reference infrastructure configuration standards;

in response to the validation agent of the one or more agents classifying the IaC as the executable IaC, transmitting, by a deployment agent of the one or more agents, the executable IaC to a set of cloud service computing systems;

in response to the validation agent of the one or more agents classifying the IaC as the non-executable IaC, receiving, by the extraction agent of the one or more agents, the non-executable IaC from the validation agent of the one or more agents, wherein the non-executable IaC includes at least one error indicator comprising a message identifying one or more conditions to be corrected or additional data to be provided to convert the non-executable IaC to the executable IaC;

extracting, by the extraction agent of the one or more agents, using the first machine learning model, the at least one error indicator from the non-executable IaC to transmit to the user computing device, wherein the user provides user instructions via the user interface of the user computing device for the one or more conditions to be corrected and the additional data to convert the non-executable IaC to the executable IaC, and wherein the user instructions comprise at least one of: clarification of resource requirements, values required for the set of parameters, selection of resource types or configurations, clarification of intended relationships between infrastructure components, or approval for modification of system-provided suggestions to the non-executable IaC;

in response to capturing, via the user interface of the user computing device, the user instructions to convert the non-executable IaC to the executable IaC, receiving, by the coding agent of the one or more agents, the non-executable IaC, the at least one error indicator, and the user instructions from the extraction agent of the one or more agents; and generating, by the coding agent of the one or more agents, an updated IaC, wherein the one or more agents iteratively modify the updated IaC until the validation agent of the one or more agents classifies the updated IaC to the executable IaC.

11. The one or more non-transitory computer-readable media of claim 10, wherein the IaC generated by the coding agent of the one or more agents includes one or more of a provider set, a resource set, a module set, a state set, a variable set, or an output set.

12. The one or more non-transitory computer-readable media of claim 10, the operations further comprising:

generating, by the deployment agent of the one or more agents, an identifier for a particular version of the IaC generated by the coding agent of the one or more agents, wherein the identifier includes nomenclature and a timestamp for the particular version of the IaC for tracking;

storing, by the deployment agent of the one or more agents, the particular version of the IaC with the identifier in a storage resource; and tracking, by the deployment agent of the one or more agents, the particular version of the IaC with the identifier in the storage resource, wherein tracking the particular version of the IaC enables the user to select, via the user interface, a version from each version of the IaC in the storage resource to retrieve or redeploy by the deployment agent of the one or more agents.

13. The one or more non-transitory computer-readable media of claim 10, the operations further comprising:

coordinating, by the deployment agent of the one or more agents, operations of the extraction agent, coding agent, and validation agent of the one or more agents, wherein the coordinating comprises:

invoking the extraction agent of the one or more agents to extract the set of parameters from the data provided via the user interface of the user computing device, providing the extracted set of parameters to the coding agent of the one or more agents to generate the IaC, transmitting the generated IaC to the validation agent of the one or more agents for validation by classifying the IaC as the executable IaC or the non-executable IaC, and in response to the validation agent of the one or more agents classifying the IaC as the executable IaC, initiating deployment of the executable IaC to the set of cloud service computing systems.

14. The one or more non-transitory computer-readable media of claim 10, the operations further comprising:

in response to the validation agent of the one or more agents classifying the IaC as the non-executable IaC, coordinating, by the deployment agent of the one or more agents, the operations of the extraction agent, coding agent, and validation agent of the one or more agents to iteratively modify the non-executable IaC until the validation agent of the one or more agents classifies the updated IaC to the executable IaC, wherein the deployment agent of the one or more agents routes error indicators and user instructions to the coding agent of the one or more agents for iterative modification of the non-executable IaC.

15. A computing system having at least one processor and at least one memory having computer-executable instructions stored thereon that, when executed by the at least one processor, cause the computing system to perform operations for automatically generating infrastructure-as-code (IaC) executables using artifacts processed by one or more agents in an agentic architecture, the operations comprising:

parsing, by a first agent of the one or more agents, using a first machine learning model, data provided by a user via a user interface of a user computing device,
wherein the data includes at least one diagram comprising a set of nodes, connectors, and metadata sufficient to derive a set of parameters comprising two or more of: entity types, attributes, or relationships that correspond to infrastructure components for generating the IaC;

applying, by a second agent of the one or more agents, a second machine learning model to generate the IaC using the set of parameters;

processing, by a third agent of the one or more agents, using a third machine learning model, the IaC by:
determining syntactic validity of the IaC,
determining compliance with one or more reference infrastructure configuration standards, and
classifying the IaC as an executable IaC or a non-executable IaC based on the syntactic validity of the IaC and the compliance with the one or more reference infrastructure configuration standards;

in response to the third agent of the one or more agents classifying the IaC as the executable IaC, transmitting, by a fourth agent of the one or more agents, the executable IaC to a set of cloud service computing systems;

in response to the third agent of the one or more agents classifying the IaC as the non-executable IaC, receiving, by the first agent of the one or more agents, the non-executable IaC from the third agent of the one or more agents,
wherein the non-executable IaC includes at least one error indicator comprising a message identifying one or more conditions to be corrected or additional data to be provided to convert the non-executable IaC to the executable IaC;

extracting, by the first agent of the one or more agents, using the first machine learning model, the at least one error indicator from the non-executable IaC to transmit to the user computing device,
wherein the user provides user instructions via the user interface of the user computing device for the one or more conditions to be corrected and the additional data to convert the non-executable IaC to the executable IaC, and
wherein the user instructions comprise at least one of: clarification of resource requirements, values required for the set of parameters, selection of resource types or configurations, clarification of intended relationships between infrastructure components, or approval for modification of system-provided suggestions to the non-executable IaC;

in response to capturing, via the user interface of the user computing device, the user instructions to convert the non-executable IaC to the executable IaC, receiving, by the second agent of the one or more agents, the non-executable IaC, the at least one error indicator, and the user instructions from the first agent of the one or more agents; and generating, by the second agent of the one or more agents, an updated IaC,
wherein the one or more agents iteratively modify the updated IaC until the third agent of the one or more agents classifies the updated IaC to the executable IaC.

16. The computing system of claim 15, the operations further comprising:

generating, by the fourth agent of the one or more agents, an identifier for a particular version of the IaC generated by the second agent of the one or more agents,
wherein the identifier includes nomenclature and a timestamp for the particular version of the IaC for tracking;

storing, by the fourth agent of the one or more agents, the particular version of the IaC with the identifier in a storage resource; and tracking, by the fourth agent of the one or more agents, the particular version of the IaC with the identifier in the storage resource,
wherein tracking the particular version of the IaC enables the user to select, via the user interface, a version from each version of the IaC in the storage resource to retrieve or redeploy by the fourth agent of the one or more agents.

17. The computing system of claim 15, the operations further comprising:

coordinating, by the fourth agent of the one or more agents, operations of the first agent, second agent, and third agent of the one or more agents,
wherein the coordinating comprises:
invoking the first agent of the one or more agents to extract the set of parameters from the data provided via the user interface of the user computing device,
providing the extracted set of parameters to the second agent of the one or more agents to generate the IaC,
transmitting the generated IaC to the third agent of the one or more agents for validation by classifying the IaC as the executable IaC or the non-executable IaC, and
in response to the third agent of the one or more agents classifying the IaC as the executable IaC, initiating deployment of the executable IaC to the set of cloud service computing systems.

* * * * *